United States Patent
Lee et al.

(10) Patent No.: US 10,152,084 B2
(45) Date of Patent: Dec. 11, 2018

(54) ELECTRONIC DEVICE

(71) Applicant: LG ELECTRONICS INC., Seoul (KR)

(72) Inventors: Kyuho Lee, Seoul (KR); Byungwoon Jung, Seoul (KR); Eunkwang Koh, Seoul (KR); Hyunwoo Kim, Seoul (KR); Junghyen Ha, Seoul (KR); Hyengcheul Choi, Seoul (KR); Ansun Hyun, Seoul (KR); Chisang You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 15/152,720

(22) Filed: May 12, 2016

(65) Prior Publication Data

US 2016/0349789 A1   Dec. 1, 2016

(30) Foreign Application Priority Data

Jun. 1, 2015  (KR) .................. 10-2015-0077069

(51) Int. Cl.
*H01Q 1/24* (2006.01)
*G06F 1/16* (2006.01)
*H04B 5/00* (2006.01)
*H01Q 1/27* (2006.01)
*H01Q 7/00* (2006.01)

(52) U.S. Cl.
CPC ............ *G06F 1/163* (2013.01); *H01Q 1/243* (2013.01); *H01Q 1/273* (2013.01); *H01Q 7/00* (2013.01); *H04B 5/0087* (2013.01)

(58) Field of Classification Search
CPC .......... H01Q 1/243; H01Q 1/273; H01Q 7/00; H04B 5/0087; G06F 1/163
See application file for complete search history.

(56) References Cited

U.S. PATENT DOCUMENTS

| | | | |
|---|---|---|---|
| 6,154,177 A * | 11/2000 | Saito | H01Q 1/243 343/702 |
| 2009/0121944 A1* | 5/2009 | Sotoudeh | H01Q 1/243 343/702 |
| 2010/0321325 A1* | 12/2010 | Springer | G06F 3/041 345/174 |
| 2013/0078917 A1* | 3/2013 | Cho | H01Q 1/243 455/41.1 |
| 2014/0328084 A1* | 11/2014 | Chuang | H05K 5/0017 362/623 |
| 2015/0311960 A1* | 10/2015 | Samardzija | G06F 1/163 455/90.3 |
| 2016/0241306 A1* | 8/2016 | Moon | H01Q 1/2208 |
| 2017/0352925 A1* | 12/2017 | Wand | H01M 10/4257 |

* cited by examiner

*Primary Examiner* — Dieu H Duong
(74) *Attorney, Agent, or Firm* — Birch, Stewart, Kolasch & Birch, LLP

(57) ABSTRACT

A mobile terminal including a display unit including a window glass and a display module; a front case and a rear case configured to support the display unit; an antenna including a first coil formed on an edge region of a rear surface of the window glass or formed on an edge region of a front surface of the front case, a second coil formed at a height different from that of the first coil in a thickness direction of the mobile terminal, and a conductive hole configured to electrically connect the first coil and the second coil; a battery configured to supply power to the mobile terminal; and a battery cover positioned on a back side of the display unit and including a metal.

16 Claims, 33 Drawing Sheets

FIG. 28
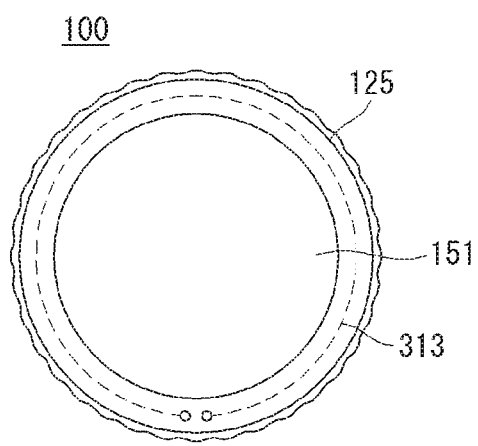
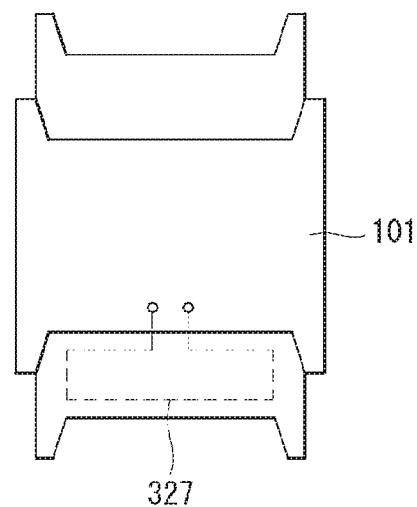

FIG. 29
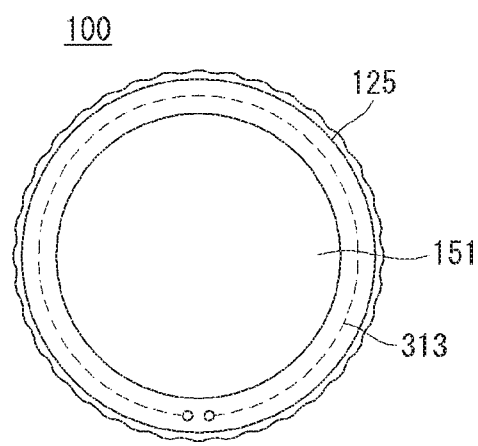
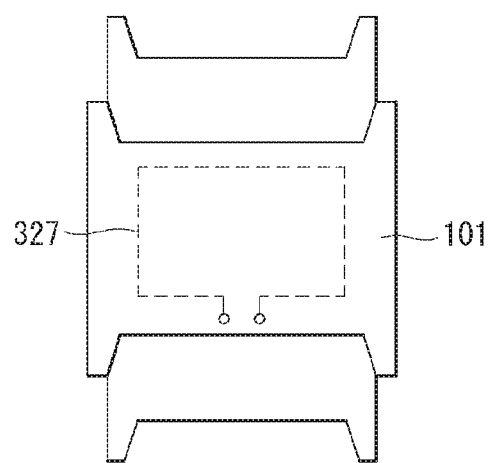

→ : first coil current
⇒ : second coil current
--→ : ground coil current

ELECTRONIC DEVICE

This application claims priority to Korean Patent Application No. 10-2015-0077069 filed on Jun. 1, 2015, the entire contents of which is hereby incorporated by reference in its entirely.

BACKGROUND OF THE INVENTION

Field of the Invention

The present disclosure relates to an electronic device and, more particularly, to an electronic device in which a first coil and a second coil of a near field communication (NFC) antenna are formed at different heights.

Discussion of the Related Art

Terminals may be classified as mobile/portable terminals and stationary terminals according to whether or not they are portable. Mobile terminals may also be classified as handheld terminals and vehicle-mounted terminals according to whether or not users can directly carry them around.

Terminals are increasingly diversified in regard to the functionality thereof. For example, functions of terminals include functions of data and voice communication, image capturing and video capturing through a camera, voice recording, playing music files through a speaker system, and outputting images or video on a display unit. Some terminals have an electronic game playback function or perform a multimedia player function. In particular, recent mobile terminals are able to receive broadcast signals and a multicast signal providing visual contents such as video or a television program.

As terminals are increasingly diversified in functionality thereof, they are realized as multimedia players supporting sophisticated functions such as the capturing of images or video, the playback of music or video files, the playing of games, the reception of broadcast signals, and the like.

In order to support and increase the functionality of terminals, improvements in structural part and/or software part of terminals may be considered.

Recently, research into wearable type electronic devices that may be worn on users' body has conducted. For example, glass type or watch type electronic devices have been attempted. In case of wearable type electronic devices, required electronic elements need to be disposed in a limited space, while satisfying design requirements, and thus, the necessity for an optimized design is on the rise.

SUMMARY OF THE INVENTION

In an aspect, the present invention provides an electronic device may include: a display unit configured to include a window glass and a display module; a first coil positioned under the window glass; and a second coil connected to the first coil and formed at a height different from that of the first coil in a thickness direction of the electronic device.

In another aspect, the present invention provides an electronic device may include: a front case; a display unit coupled to a front side of the front case; a battery cover coupled to a back side of a body and formed of a metal in at least a portion thereof; and an antenna having at least a partial component formed in the display unit, wherein the antenna includes a first coil prepared on the display unit and a second coil electrically connected to the first coil and radiates a magnetic field toward a front side of the body, and the second coil is formed in a position different from that of the first coil in a thickness direction of the front case.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 27 through 29 are disassembled plan views of an electronic device according to an embodiment of the present disclosure.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
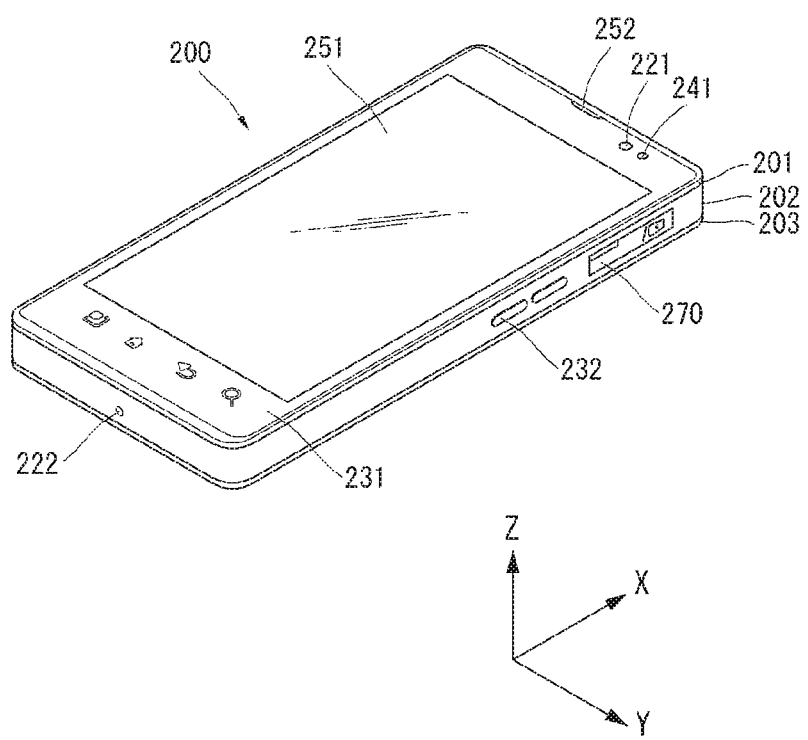
FIG. 1 is a front perspective view illustrating an example of a mobile terminal related to the present disclosure.
Figure 2:
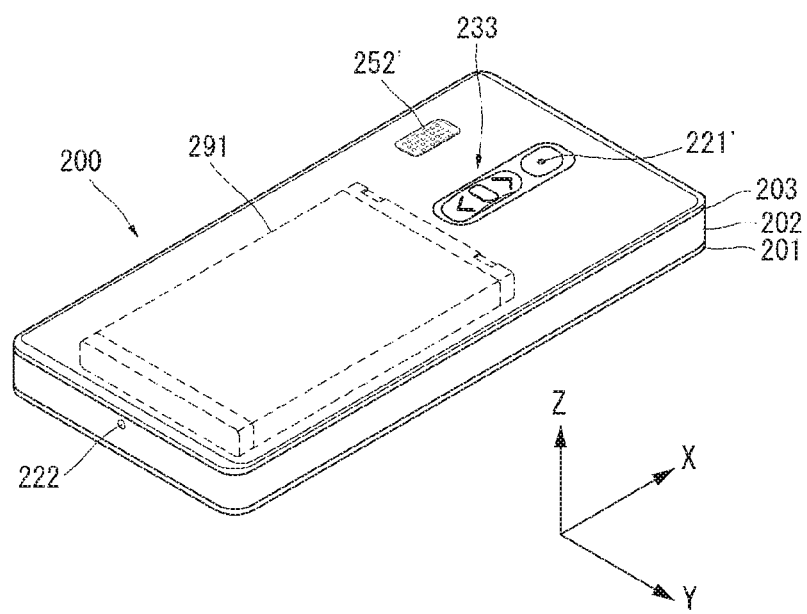
FIG. 2 is a rear perspective view of the mobile terminal illustrated in FIG. 1.

FIG. 1 is a front perspective view illustrating an example of a mobile terminal (or an electronic device) 200 related to the present disclosure, and FIG. 2 is a rear perspective view of the mobile terminal 200 illustrated in FIG. 1. The disclosed mobile terminal 200 disclosed herein is provided with a bar-type terminal body. However, the present disclosure may not be limited thereto, and may also be applicable to various structures such as a slide type, a folder type, a swing type, or a swivel type in which two and more bodies are coupled with each other in a relatively movable manner.

The terminal body includes a case (casing, housing, cover, etc.) forming the appearance of the terminal. In this embodiment, the case may be divided into a front case 201, a rear case 202, and a battery cover 203. Various electronic components are installed in a space formed between the front case 201 and the rear case 202. At least one frame may be additionally disposed between the front case 201 and the rear case 202.

The cases may be formed by injection-molding a synthetic resin or may also be formed of a metal, for example, stainless steel (STS), titanium (Ti), aluminium, or the like. A display unit 251, an audio output module 252, a proximity sensor 241, a camera module 221, etc., may be disposed mainly on the front case 201 of the terminal body 200. A microphone 222, a side input unit 232, an interface 270, or the like, may be disposed on sides of the front case 201 and the rear case 202.

The display unit 251 occupies the most of a main surface of the front case 201. That is, the display unit 251 is disposed on the front surface of the terminal body and formed to display visual information. The audio output unit 252, the proximity sensor 241, and the camera module 221 are disposed at a region adjacent to one end portion among both end portions of the display unit 251, and a front input unit 231 is disposed at a region adjacent to another end portion.

The front input unit 231 is an example of a user input unit and may include a plurality of manipulation units. The manipulation units may be generally referred to as a manipulating portion, and any scheme may be employed in the manipulation portion as long as it may be operated by the user in a tactile manner. In the present embodiment, the front input unit 231 is configured as a touch key. However, the present disclosure is not limited thereto and a push key may be added to the front input unit 231.

Also, the display unit 251 may form a touch screen together with a touch sensor, and in this instance, the touch screen may be a user input unit. Through this, a configuration without the front input unit 231 on the front surface of the terminal may also be used. In this instance, the mobile terminal 200 can be configured such that an input manipulation with respect to the terminal body is performed only through the display unit 251 and a rear input module 233 as described hereinafter.

A side input unit 232 configured as another example of the user input unit may receive a command such as adjustment of a volume of a sound output from the speaker 252 or switching to a touch recognition mode of the display unit 251.

Referring to FIG. 2, a camera module 221' may additionally be disposed on a rear surface of the terminal body, in other words, on the rear case 202 of the terminal body. The camera module 221' may have an image capture direction which is substantially opposite to that of the camera 221 (please refer to FIG. 1) and have a different number of pixels than the camera module 221.

For example, the front camera module 221 may have a smaller number of pixels to capture an image of the user's face and transmit the captured image to a counterpart in case of a video call, or the like, and the camera module 221' on the rear surface may have a larger number of pixels to capture an image of a general object and not immediately transmit the captured image in many cases. The camera modules 221 and 221' may be installed on the terminal body such that they can be rotatable or popped up.

A flash and a mirror may be additionally disposed to be adjacent to the camera module 221'. When an image of a subject is captured with the camera module 221', the flash illuminates the subject. The mirror allows the user to see himself or herself when he or she wants to capture his or her own image (i.e., self-image capturing) using the camera module 221'.

A speaker 252' may be additionally disposed on the rear surface of the terminal body. The speaker 252' on the rear surface may implement a stereoscopic function along with the speaker 252 (please refer to FIG. 2) of the front surface, and may be used for implementing a speaker phone mode during call communication.

A battery 291 for supplying power to the mobile terminal 200 can be installed on the terminal body. The battery 291 is configured as an example of a power supply unit 190. The battery 291 may be installed in the terminal body or may be detachably attached to the terminal body.

As illustrated, the rear input module 233 is disposed on the rear surface of the terminal body. The rear input module 233 is configured as another example of the user input unit. The rear input module 233 may be positioned to be adjacent to the camera module 221' exposed to the rear surface of the terminal body.

The rear input module 233 may be manipulated to receive a command for controlling an operation of the mobile terminal 200 and input contents may be variously set. For example, the rear input module 233 may receive a command such as ON/OFF of power, starting, ending, scrolling, etc., a command such as controlling of the volume of a sound output from the speakers 252 and 252' or conversion into a touch recognition mode of the display unit 251.

The rear input module 233 is implemented in the form available for a push input. Hereinafter, a configuration of the rear input module 233 will be described in detail. In particular, FIG. 3 is a disassembled perspective view of the mobile terminal 200 illustrated in FIG. 2, and FIG. 4 is a cross-sectional view of the mobile terminal 200 according to an embodiment of the present disclosure.

Figure 3:
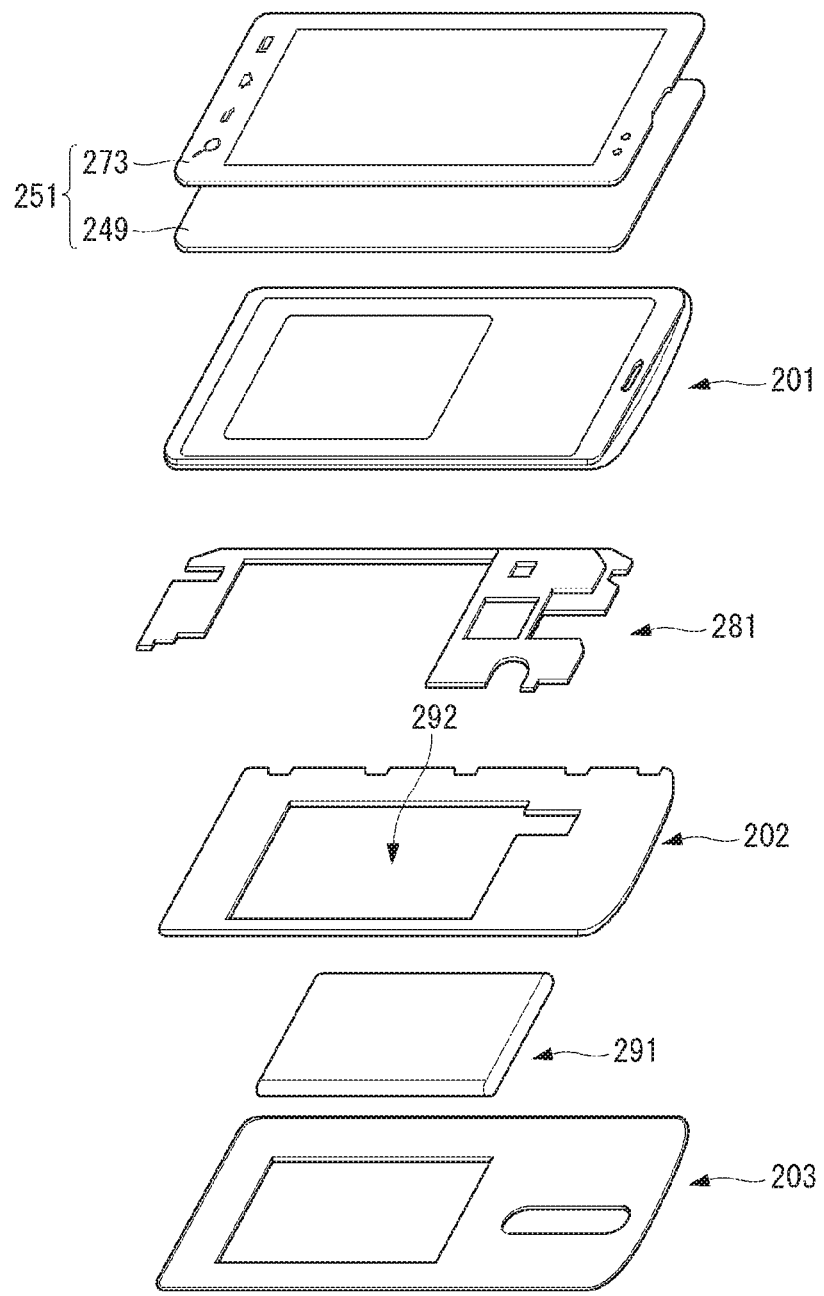
FIG. 3 is a disassembled perspective view of the mobile terminal illustrated in FIG. 2.
Figure 4:
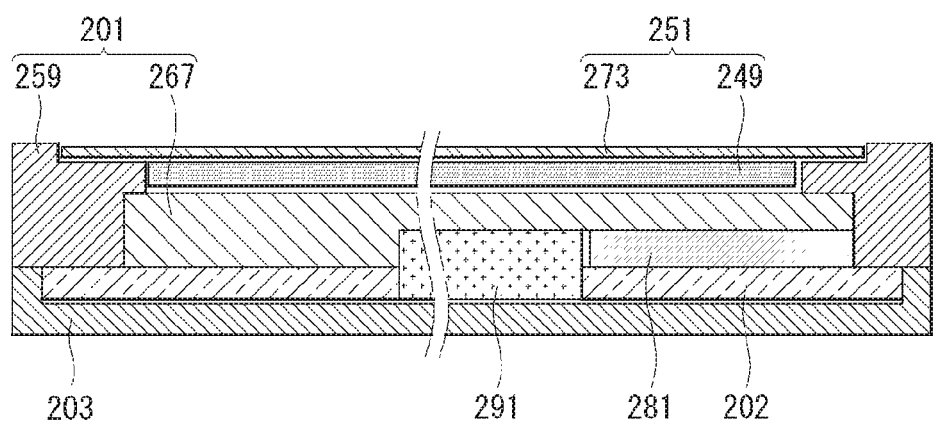
FIG. 4 is a cross-sectional view of a mobile terminal according to an embodiment of the present disclosure.

Referring to FIGS. 3 and 4, in the mobile terminal 200 according to an embodiment, the display unit 251 includes a window glass 273 and a display module 249. The window glass 273 and the display module 249 may be integrally configured.

The window glass 273 may be coupled to one surface of the front case 201. A touch sensing pattern may be formed on one surface of the window glass 273 to sense a touch. The touch sensing pattern may be formed to sense a touch input and may be light-transmissive. The touch sensing pattern may be positioned on a front surface of a rear surface of the window glass 273. The touch sensing pattern may convert a change in a voltage, or the like, generated at a specific portion of the window glass 273 into an electrical input signal. The window glass 273 may include a transparent synthetic resin such as polycarbonate or acryl, or glass.

The display module 249 may be coupled to one surface of the window glass 273. For example, the display module 249 may be a thin film transistor-liquid crystal display (TFT-LCD). However, the present disclosure is not limited thereto and the display module 249 may be an organic light emitting diode (OLED) display, a flexible display, or a three-dimensional (3D) display.

A printed circuit board (PCB) 281 is installed in the terminal body. The PCB 281 may be installed in the front case 201 or the rear case 202 or may be installed in a separate structure. Hereinafter, a structure in which the front case 201 and the rear case 202 are separately provided will be described as an example, but the present disclosure is not limited thereto and the cases 201 and 202 may be integrally formed.

The PCB 281 is configured as an example of a control unit for operating various functions of the mobile terminal 200. Various electronic elements are installed on the PCB 281 in order to perform a function as a control unit. The PCB 281 may be provided in plurality, and the plurality of PCBs may be combined to perform a function of the control unit. For example, the PCB 281 may have a main circuit board and a sub-circuit board which are electrically connected to each other, and at least portions thereof may be disposed to overlap each other in a thickness direction of the terminal body, to provide a spatially expanded structure.

A battery accommodation portion 292 accommodating the battery 291 is formed in the rear case 202, and the battery cover 203 is detachably coupled to the rear case 202 to cover the battery accommodation portion 292. Unlike the structure in which the battery 291 is detachably coupled, the battery 291 may be configured to be installed in the terminal body and unable to be detachable. The battery cover 203 may be disposed on the back side of the display unit 251, and at least a portion of the battery cover 203 may be formed of a metal.

Materials of an edge region 259 and a central region 267 of the front case 201 may be different. For example, the edge region 259 of the front case 201 may include a mold material. Also, the central region 267 of the front case 201 may include a metal. In another example, the battery cover 203 may cover a side surface of the mobile terminal 200. That is, the battery cover 203 may extend to the side surface of the mobile terminal 200 to cover an edge region of the front case 201. In another example, the battery cover 203 may cover the side surface of the mobile terminal 200 and a side surface of the battery cover 203 may include a mold material.

Figure 5:
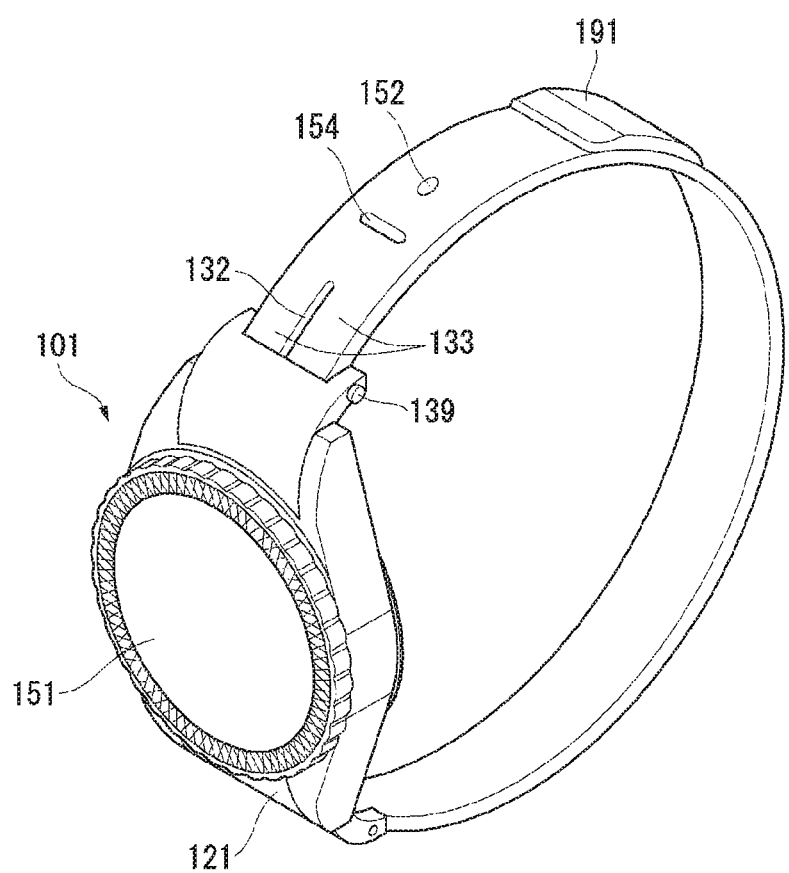
FIG. 5 is a perspective view of an electronic device related to the present disclosure.
Figure 6:
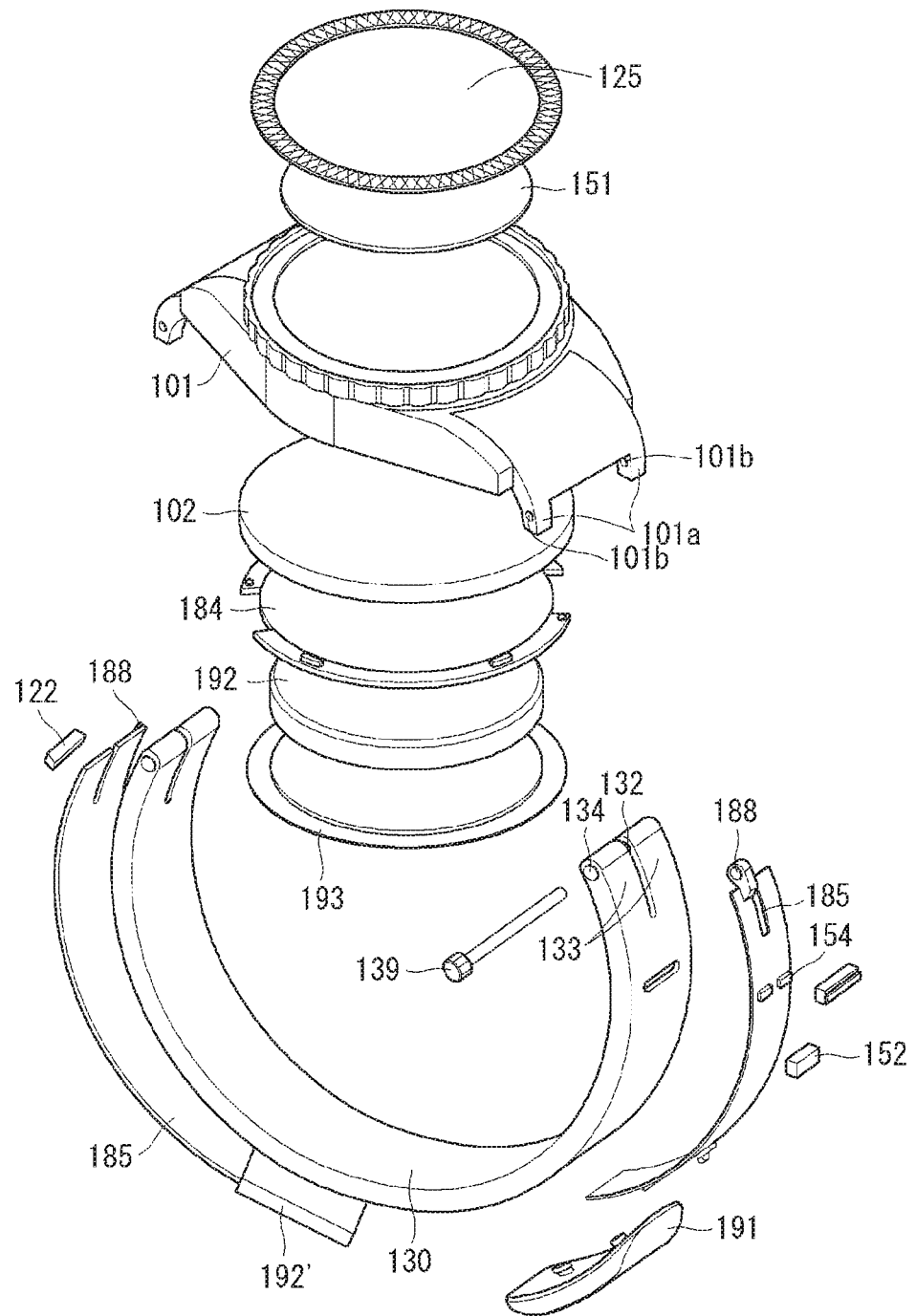
FIG. 6 is a disassembled perspective view of the electronic device of FIG. 5.

FIG. 5 is a perspective view of an electronic device related to the present disclosure, and FIG. 6 is a disassembled perspective view of the electronic device of FIG. 5. The electronic device according to an embodiment of the present disclosure may include a band part 130 including a curved surface or a flexible material in a length direction, and may be detachably attached to a main body part 101 using a hinge pine 139. Thus, the electronic device can be a smart watch, for example.

When the band part 130 is formed of a material having rigidity, the band part 130 may be formed to have a curved shape, or may be formed of a flexible material so as to be bent. The band part 130 may be wrapped around to be worn on a user's wrist. An electric element part allowing an electronic component to be mounted therein may be provided within the band part 130, and a band board 185, an audio output unit 152, a microphone 122, an optical output unit 154, and an antenna may be mounted on the electric element part.

The band board 185 includes a flexible board which is bent or curved. The band board 185 may be formed as a hard board formed of a plurality of pieces with a flexible material interposed therebetween, or the band board 185 may be entirely formed of a flexible material.

The band board 185 may have an IC mounted thereon and controlling the audio output unit 152, the microphone 122, the optical output unit 154, and the wireless communication unit 110 mounted on the band part 130. When the IC is connected to the main body part 101, the IC may control the main body part 101. The audio output unit 152, the microphone 122, the optical output unit 154, and the antenna, and the like, may be mounted on the band part 130, apart from the band board 185, but they may also be mounted on the band board 185.

The band board 185 positioned on one side and on the other side of the band part 130 may be separated as illustrated in FIG. 6, or both ends thereof may be connected to form a single band board 185. Even though the band board 185 is separated, in a case in which an end portion of the band part 130 is connected to the main body part 101 or in a case in which end portions of the band part 130 are connected to each other, the separated band board 185 may be connected.

At one side of the band board 185, the audio output unit 152, the optical output unit 154, and the IC 183 may be positioned, and a terminal for a connection to an external battery 191 may be positioned. At the other side of the band board 185, the microphone 122, the antenna 117, the IC 183, and the internal battery 192 may be mounted. The disposition may be changeable, and more components may be mounted. A battery cover 193 is also shown.

A slit 132 extending in a length direction of the band part 130 is positioned at an end portion of the band part 130. In the present embodiment, one slit 132 is formed at each of both end portions of the band part 130, and both end portions of the band part 130 are divided into two divided end portions by the slit 132. When the slit 132 is in plurality, the number of the divided end portions 133 is also increased.

Even when the band part 130 is formed of a material having rigidity, the divided end portions 133 may be formed of a flexible material. The divided end portions 133 may be bent vertically in a thickness direction of the band part 130, and the divided end portions 133 divided by the slit 132 may be bent in different directions.

A fastening hole 134 is provided at an end portion of the band part 130, that is, extending in a width direction from a side surface of the divided end portions 133. In order for the band part 130 to be fastened to the main body part 101, a hinge pin 139 is fastened to the fastening hole 134. The main body part 101 may include a hinge hole 101b through which the hinge pin 139 penetrates.

The hinge pin 139 penetrating through the band part 130 may be formed of a conductive material, and may be electrically connected to a connection ring 188 positioned at an inner side of the fastening hole 134 and the hinge hole 101b. The connection ring 188 is an annular member formed of a conductive material and provided at an inner side of the fastening hole 134 of the band part 130, and an end portion of the connection ring 188 may be connected to the band board 185 mounted on the band part 130.

The main body part 101 may have a clock character board 102 including a time scale and an hour hand and a second hand indicating time and positioned on a front surface, and a band fastening portion 101a provided at both sides thereof and coupled to the band part 130 through the hinge pin 139. The band fastening portion 101a includes a pair band part 130 fastening protrusions spaced apart from one another by an interval corresponding to a width of the band part 130 and the hinge hole 101b formed at the fastening protrusions 130. As described above, the hinge pin 139 is inserted into the hinge hole 101b to fasten the main body part 101 and the band part 130.

The main body part 101 may be a clock main body serving as a general watch. A general watch may have the band fastening portion 101a to allow a watch strap to be replaced, and the band part 130 may be replaced using the hinge pin 139 in the hinge hole 101b of the band fastening portion 101a, and thus, the electronic device of the present disclosure may be fastened to the general main body part 101.

Even the main body part 101 on which a separate electronic component is not mounted may have a battery 192 for driving the clock character board 102. The battery 192 may be used only to drive the clock character board 102, and in order to drive an electronic component provided in the band part 130 or when the display unit 151 is additionally coupled, the display unit 153 may be driven using a battery provided in the band part 130.

Alternatively, as illustrated in FIG. 6, the main body part 101 on which an electronic component is mounted may be used. The main body part 101 includes a display unit 153, a circuit unit 184 performing controlling, and a main battery 192 supplying power. As illustrated in FIG. 6, a component such as the camera 121 not provided in the electronic device may be provided in the main body part 101.

The display unit 153 may include a window glass 125 and a display module 151. The window glass 125 and the display module 151 may be integrally configured. When used as a general clock, the display module 151 may be maintained in a transparent state, and when information is output through the display module 151, the display module 151 may be changed to be opaque or semi-transparent. By having the window glass 125 on a front surface of the display module 151, both inputting and outputting may be performed.

Thus, when an electronic component is mounted in the main body part 101, the connection ring 188 may be provided at an inner side of the hinge hole 101b for an electrical connected to the electronic components, and connected to the circuit unit 184 within the main body part 101 through the connection ring 188. As the main body part 101 and the band part 130 are connected, a function may be extended.

For example, when the main body part 101 has only a display function, when the band part 130 is connected, wireless communication with a base station may be performed using the antenna 117 provided in the band part 130 or a call or data may be transmitted or received through near field communication (NFC), and audio information may also be output through the audio output module 152 provided in the band part 130.

In addition to the connection to the main body part 101 through an end portion of the band part 130, an external power source may be connected through the hinge pin 139 to receive power, or an external terminal such as a computer may be connected to be used. The electronic device according to the present disclosure may employ a short range communication technique such as Bluetooth, radio frequency identification (RFID), infrared data association (IrDA), ultra-wideband (UWB), ZigBee, near field communication (NFC), or a wireless universal serial bus (USB).

Among them, an NFC module provided in the electronic device supports a non-contact type short range wireless communication between terminals at a distance of about 10 centimeters. The NFC module may operate in any one of a card mode, a reader mode, and a peer-to-peer (P2P) mode. In order for the NFC module to operate in the card mode, the electronic device 100 may further include a security module storing card information.

Here, the security module may be a physical medium such as a universal integrated circuit card (UICC) (for example, a subscriber identification module (SIM) or a universal SIM (USIM)), a secure micro-SD, or a speaker, or may be a logical medium (for example, an embedded secure element (SE)) embedded in the electronic device. The NFC module and the security module may perform data exchange based on a single wire protocol (SWP).

When the NFC module is operated in the card module, the electronic device may transmit card information stored therein to the outside, like a conventional IC card. In more detail, when an electronic device storing card information of a payment card such as a credit card or a bus card is allowed to be close to a payment machine, a mobile short range payment may be performed, and when an electronic device storing card information of an access control card is allowed to be close to an access approval machine, an access approval procedure may be started.

A card such as a credit card, a traffic card, and an access control card may be installed in a security module in the form of an applet, and the security module may store card information regarding the installed card. Here, the card information of the payment card may be at least one of a card number, a balance, and use particulars, and card information of the access control card may be at least one of a name, a number (for example, a student ID number or a company ID number), and entry particulars of a user.

When the NFC module is operated in a reader mode, the electronic device may read data from an external tag. Here, data received by the electronic device from the tag may be coded to an NFC data exchange format. In addition, an NFC forum defines four record types. In more detail, the NFC forum prescribes four record type definitions such as a smart poster, text, a uniform resource identifier (URI), and general control. When data received from the tag is the smart poster type, a control unit executes a browser (for example, an Internet browser), and when data received from the tag is the text type, the control unit may execute a text viewer. When data received from the tag is the URI type, the control unit may execute a browser or make a phone call, and when data received from the tag is the general control type, the control unit may execute an appropriate operation according to control contents.

When the NFC module is operated in the P2P mode, the electronic device may perform P2P communication with another electronic device. Here, a logical link control protocol (LLCP) may be applied to the P2P communication. For the P2P communication, a connection may be established between the electronic device and the other electronic device. Here, the established connection may be classified into a connectionless mode terminated after one packet is exchanged and a connection-oriented mode in which packets are continuously exchanged. Through P2P communication, data such as an electronic name card, contact number information, a digital photograph, and a uniform resource locator (URL), and a set-up parameter for Bluetooth or Wi-Fi connection may be exchanged. Here, however, since an available distance of NFC communication is short, the P2P mode may be effectively utilized for exchanging small data.

Hereinafter, embodiments related to a control method that may be implemented in the electronic device configured as described above will be described with reference to the accompanying drawings. It will be apparent to those skilled in the art that modifications and variations can be made without departing from the spirit and scope of the invention.

Figure 7:
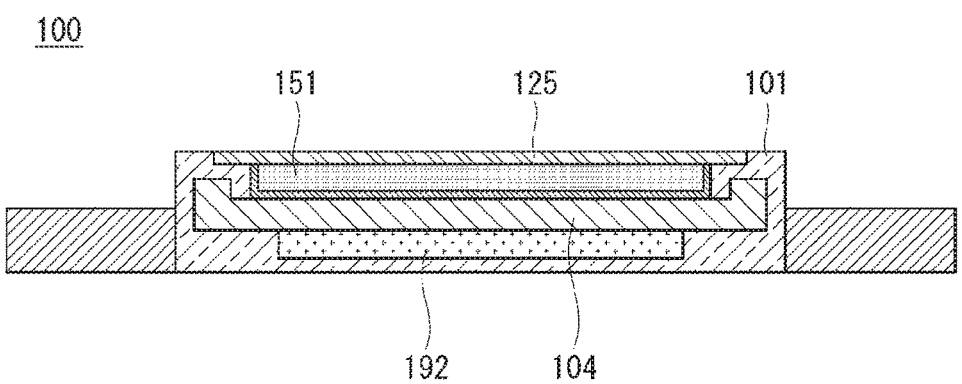
FIG. 7 is a cross-sectional view of an electronic device according to an embodiment of the present disclosure.

FIG. 7 is a cross-sectional view of an electronic device 100 according to an embodiment of the present disclosure. Referring to FIG. 7, the window glass 125 may be coupled to at least one surface of the main body part 101. A touch sensing pattern may be formed on one surface of the window glass 125 to sense a touch. The touch sensing pattern may be positioned on a front or rear surface of the window glass 125. The touch sensing pattern may convert a change in a voltage, or the like, generated at a specific portion of the window glass 125 into an electrical input signal. The window glass 125 may include a transparent synthetic resin such as polycarbonate or acryl, or glass.

The display module 151 may be coupled to one surface of the window glass 125. For example, the display module 151 may be a thin film transistor-liquid crystal display (TFT-LCD). However, the present disclosure is not limited thereto and the display module 151 may be an organic light emitting diode (OLED) display, a flexible display, or a three-dimensional (3D) display.

A frame 104 may be coupled to one surface of the display module 151. The frame 104 may serve to support the display module 151. The frame 104 may include a metal. For example, the frame 104 may include magnesium. The frame 104 may protect one surface of the display module 151 and surfaces extending from the one surface of the display module as well. That is, the frame 104 may extend to a side surface of the display module 151 to cover the display module 151.

A shielding paint layer may be positioned on a lower surface of the display module 151. That is, the shielding paint layer may be positioned between the display module 151 and the frame 104. For example, the shielding paint layer may include an iron oxide and/or a ferrite material. The shielding paint layer may prevent occurrence of an eddy current interfering with an antenna radiation. In another example, the shielding paint layer may cover the side surface of the display module 151. That is, the shielding paint layer may extend to the side surface of the display module 151 to cover an edge region of the display module 151.

The battery 192 may be received on one surface of the frame 104. The battery 192 may be received on one surface of the frame 104 by the main body part 101 (to be described hereinafter). Unlike the foregoing structure in which the battery 192 is detachably installed, the battery 192 may be installed within the terminal body and may not be detachable.

The main body part 101 protects the window glass 125, the display module 151, the frame 104, and/or the battery 192 from the outside. That is, the window glass 125, the display module 151, the frame 104, and/or the battery 192 may be installed within the main body part 101. For example, the main body part 101 may include a mold and/or metal material. The main body part 101 may be formed by injection-molding a synthetic resin or may be formed of a metal such as stainless steel, titanium, or aluminum.

Figure 8:
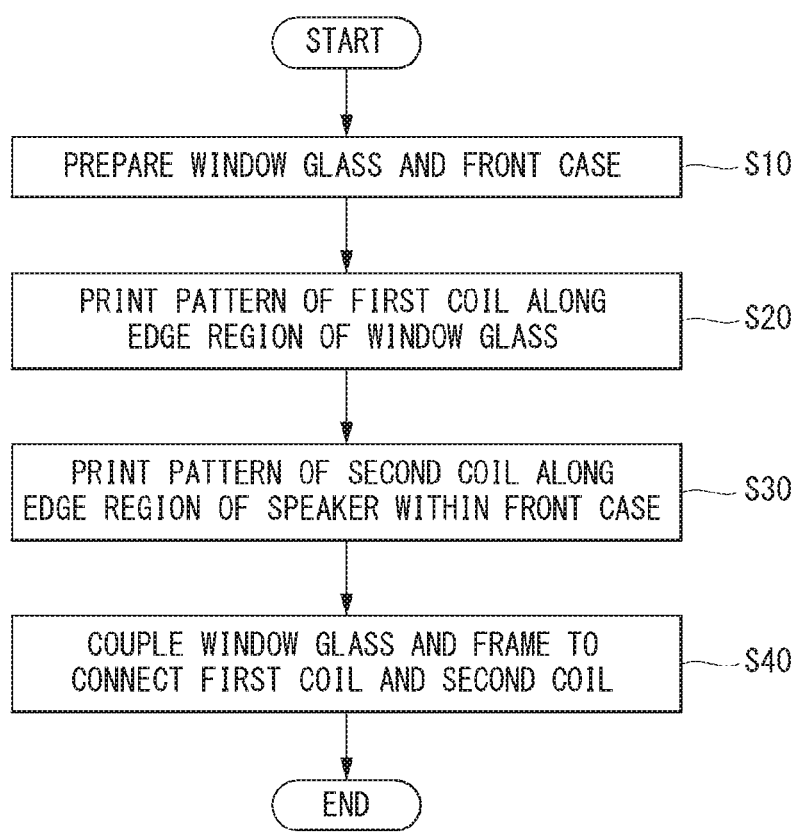
FIG. 8 is a flow chart illustrating a method of installing an antenna of an electronic device according to an embodiment of the present disclosure.
Figure 9:
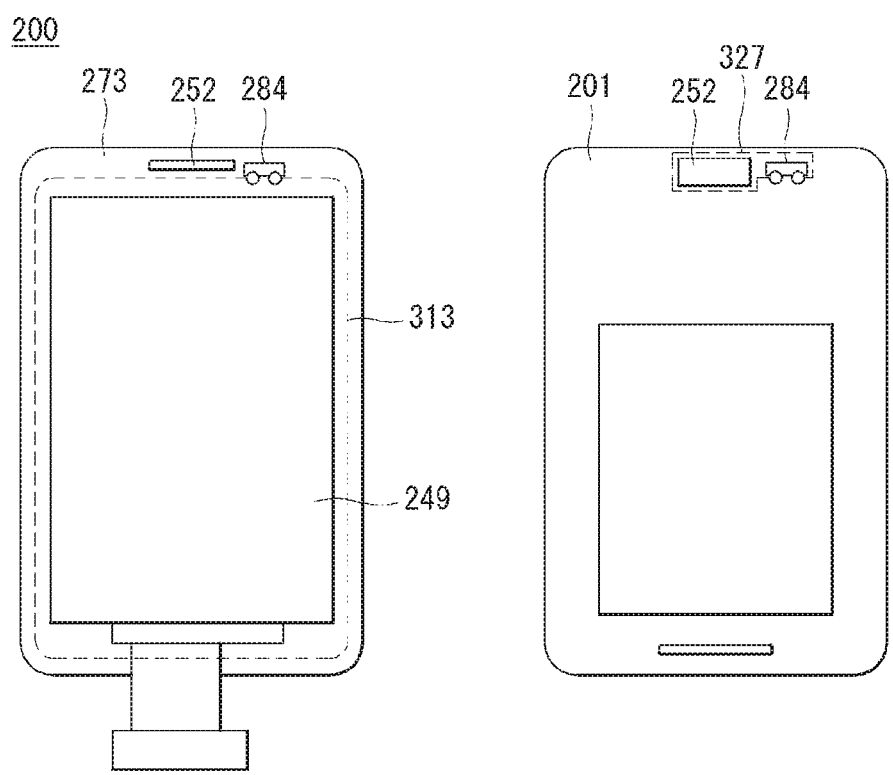
FIGS. 9 and 10 are disassembled plan views of an electronic device according to an embodiment of the present disclosure.
Figure 10:
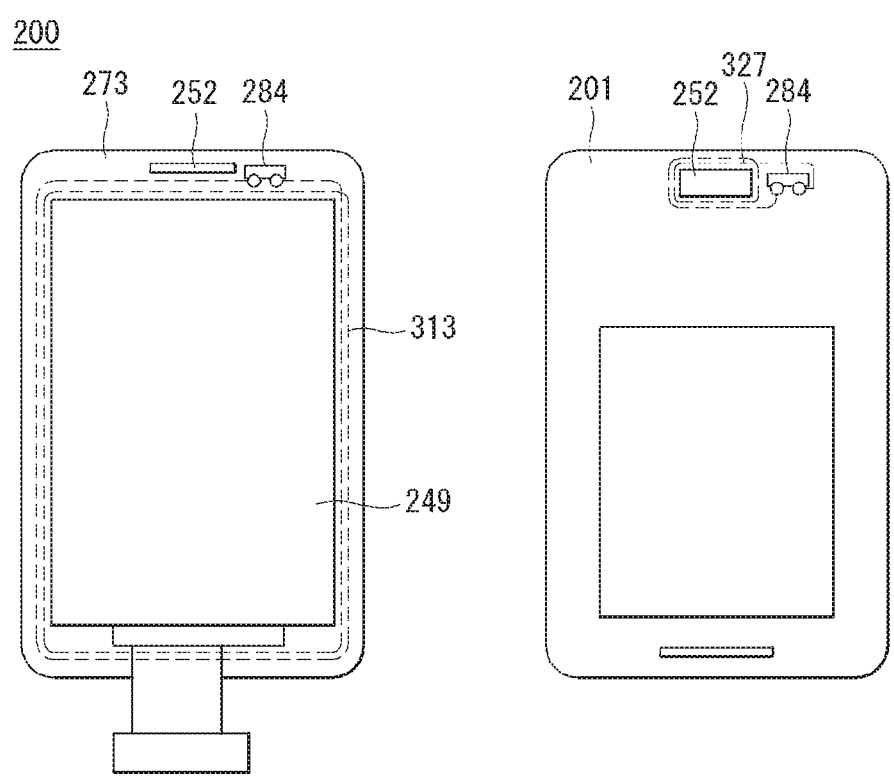

Next, FIG. 8 is a flow chart illustrating a method of installing an antenna of an electronic device according to an embodiment of the present disclosure, and FIGS. 9 and 10 are disassembled plan views of an electronic device according to an embodiment of the present disclosure. Referring to FIGS. 8 and 9, in order to install an antenna in an electronic device, first, the window glass 273 and the front case 201 are prepared (S10).

Next, a pattern of a first coil 313 is printed along an edge region of the window glass 273. In more detail, a pattern of the first coil 313 is printed along the edge region of a lower surface of the window glass 273. The edge region of the window glass 273 is an outer region of the display module. Further, the first coil 313 may be printed in a loop shape having at least one turn on the window glass 273. For example, for the first coil 313, a conducting wire may be vibration-heated through a heating device using ultrasonic vibrations, and when the heated conducting wire is brought into contact with the window glass 273, the window glass 273 is melted. Thus, the first coil 313 can be applied to the melted portion of the window glass 273 so as to be fused.

Thereafter, a pattern of a second coil 327 is printed along an outer region of the speaker 252 of the front case 201 (S30). In more detail, a pattern of the second coil 327 is printed along the outer region of the speaker 252 of an upper surface of the front case 201. The speaker 252 is surrounded by a partition, and thus the noise is small. Thus, even though the second coil 327 is printed on the outer region of the speaker 252, there is no interference in transmitting a signal.

Further, the second coil 327 may also be printed in a loop shape having at least one turn on the front case 201. For example, for the second coil 327, a conducting wire can be vibration-heated through a heating device using ultrasonic vibrations, and when the heated conducting wire is brought into contact with the front case 201, the front case 201 is melted. Thus, the second coil 327 can be applied to the melted portion of the window glass 273 so as to be fused.

Finally, the window glass 273 and the front case 201 are coupled to connect the first coil 313 and the second coil 327 (S40). For example, the first coil 313 and the second coil 327 can be connected by a conductive hole 284. The conductive hole 284 may be used to connect at least two portions of the first coil 313 and at least two portions of the second coil 327. Accordingly, the first coil 313 and the second coil 327 can be electrically connected to each other. The conductive hole 284 can also be connected to the PCB 281 in at least a portion thereof. The first coil 313 and the second coil 327 thus can serve as an antenna.

Referring to FIG. 10, in the electronic device (e.g., mobile terminal) 200 according to an embodiment of the present disclosure, the first coil 313 and/or the second coil 327 can be formed to have at least two or more turns. When the first coil 313 and/or the second coil 327 are formed to have at least two or more turns, the first coil 313 and/or the second coil 327 can radiate a stronger magnetic field.

In order for the first coil 313 to be formed to have at least two or more turns, a sufficient area may be required in the edge region of the window glass 273. In this instance, the display module 249 may have an area smaller than that of the window glass 273, compared with when the first coil 313 is formed to have one turn.

In the electronic device 200 according to an embodiment of the present disclosure, the first coil 313 and the second coil 327 can be formed to have different heights in a thickness direction of the electronic device 200. Thus, the first coil 313 and the second coil 327 can radiate a stronger magnetic field though ground coupling.

Figure 11:
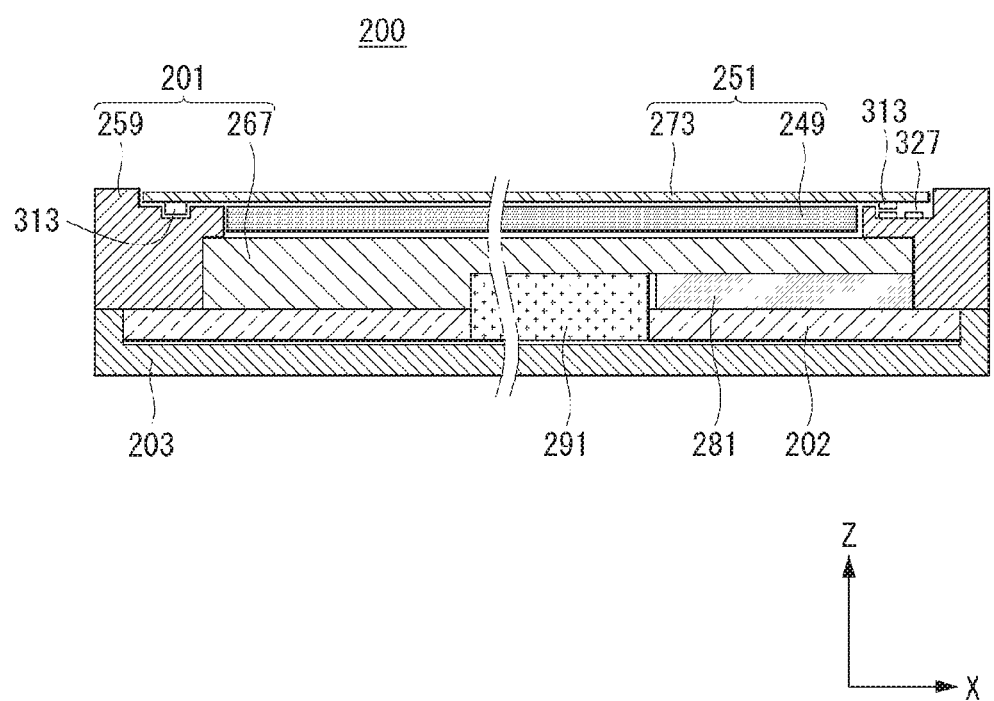
FIGS. 11 and 12 are cross-sectional views of an electronic device according to an embodiment of the present disclosure.
Figure 12:
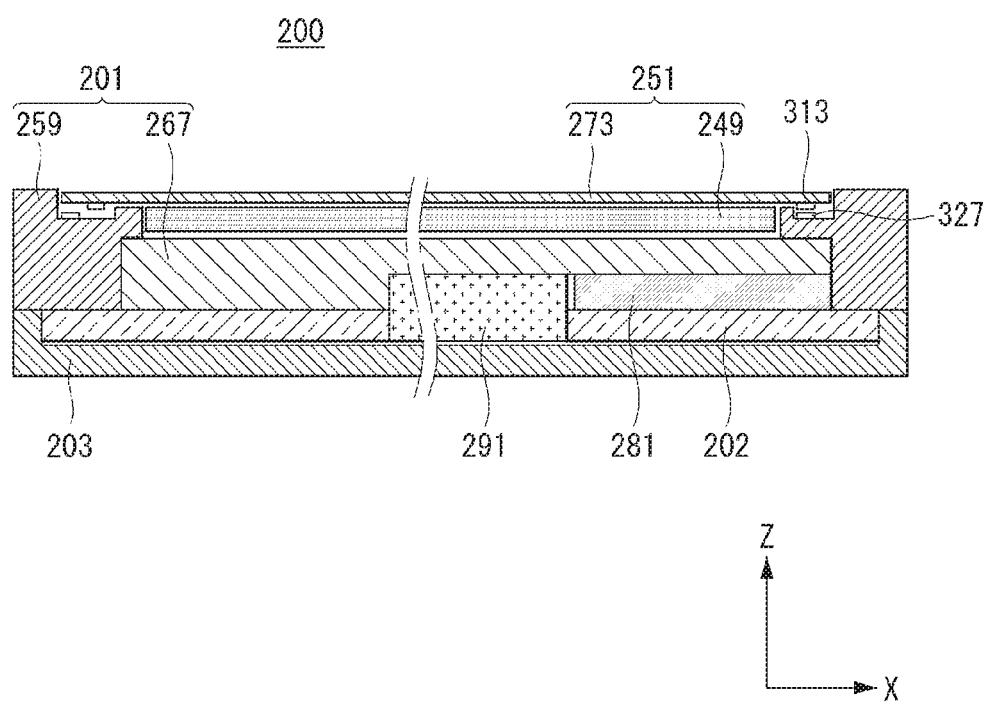

Next, FIGS. 11 and 12 are cross-sectional views of an electronic device according to an embodiment of the present disclosure. Referring to FIGS. 11 and 12, the front case 201 includes a central frame 267 and an edge frame 259. The central frame 267 forms a body of the front case 201, receives a battery 291 on a rear surface thereof, and supports the display module 249 on a front surface thereof.

In addition, the central frame 267 may include a metal, and the edge frame 259 may be positioned on a side surface and a portion of a front surface of the central frame 267. The edge frame 259 can support the window glass 273 and may include a mold material. Thus, the edge frame 259 can be easily deformed, relative to the central frame 267.

Further, the first coil 313 can be positioned on a rear surface of the window glass 273, and the second coil 327 can be positioned on an upper surface of the edge frame 259. A region of the edge frame 259 facing the region in which the first coil 313 is positioned can be inwardly depressed to secure a space for the first coil 313. As illustrated in FIG. 11, the second coil 327 can be positioned only at one edge of the window glass 273, and as illustrated in FIG. 12, the second coil 327 can be positioned at an outer region of the display module 249 similar to the region of the first coil 313.

Figure 13:
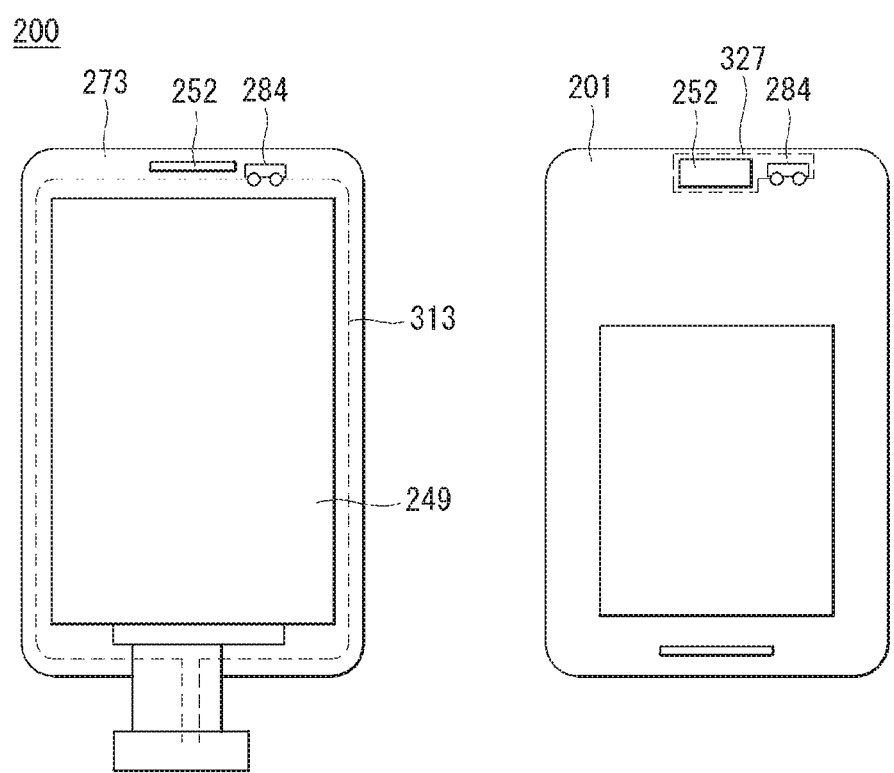
FIGS. 13 and 14 are disassembled plan views of an electronic device according to an embodiment of the present disclosure.
Figure 14:
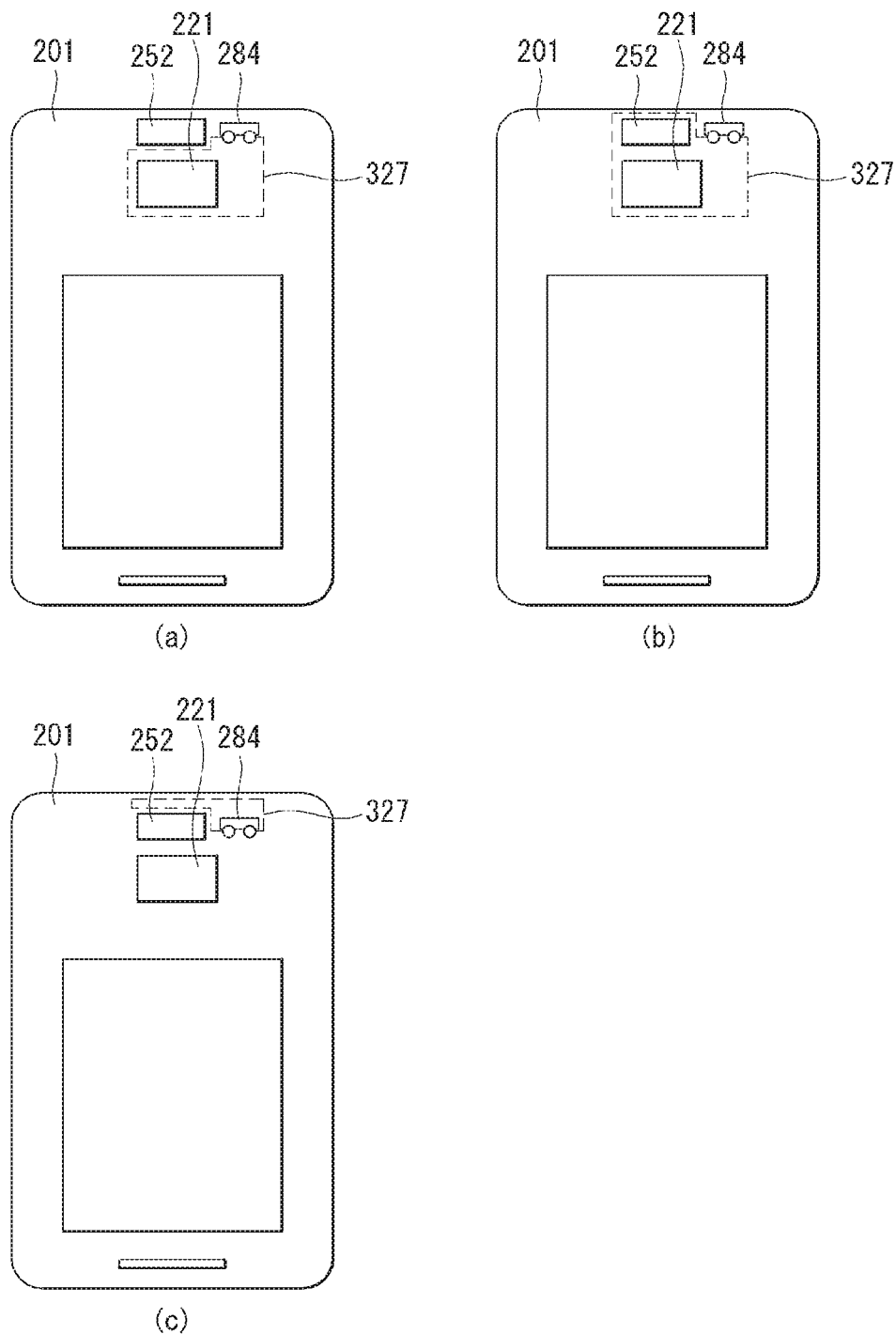

Next, FIGS. 13 and 14 are disassembled plan views of an electronic device according to another embodiment of the present disclosure. Referring to FIG. 13, at least a portion of the first coil 313 can be connected to a flexible printed circuit board (FPCB). In more detail, the first coil 313 may be connected to the FPCB on a side opposite to one portion of the first coil 313 connected to the conductive hole 284. In this instance, the FPCB can serve as a power feed supplying energy to the first coil 313 and the second coil 327.

Referring to FIG. 14, in the electronic device 200 according to an embodiment of the present disclosure, a camera 221 can be positioned on one side of the speaker 252. The camera 221 may occupy an area larger than that of the speaker 252. For example, the second coil 327 can be positioned in a region around the camera 221 of the front case 201. In another example, the second coil 327 can be positioned in a region around the camera 221 and the speaker 252 of the front case 201. In still another example, the second coil 327 may not surround the speaker 252 and the camera 221. In this instance, the second coil 327 can form at least one turn in a region excluding the speaker 252 and the camera 221.

In the electronic device 200 according to an embodiment of the present disclosure, the second coil 327 can form at least one turn in a region other the speaker 252. Thus, a loop area of the second coil 327 is increased to radiate a greater magnetic field.

Figure 15:
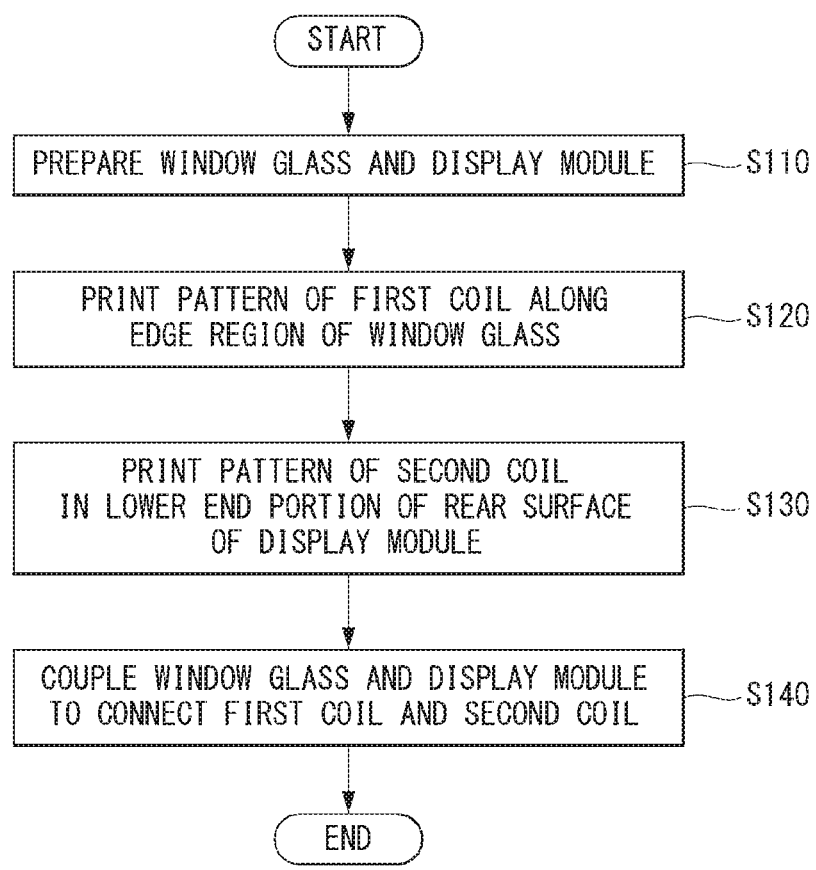
FIG. 15 is a flow chart illustrating a method of installing an antenna of an electronic device according to another embodiment of the present disclosure.
Figure 16:
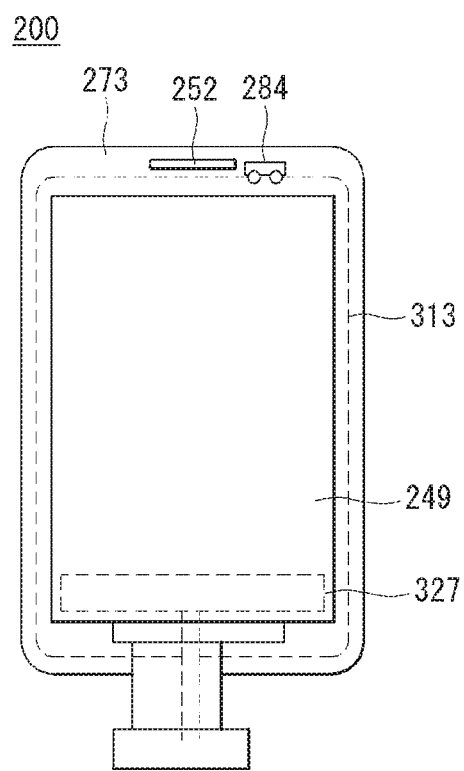
FIGS. 16 and 17 are a disassembled plan view and a perspective view illustrating an electronic device according to another embodiment of the present disclosure.
Figure 17:
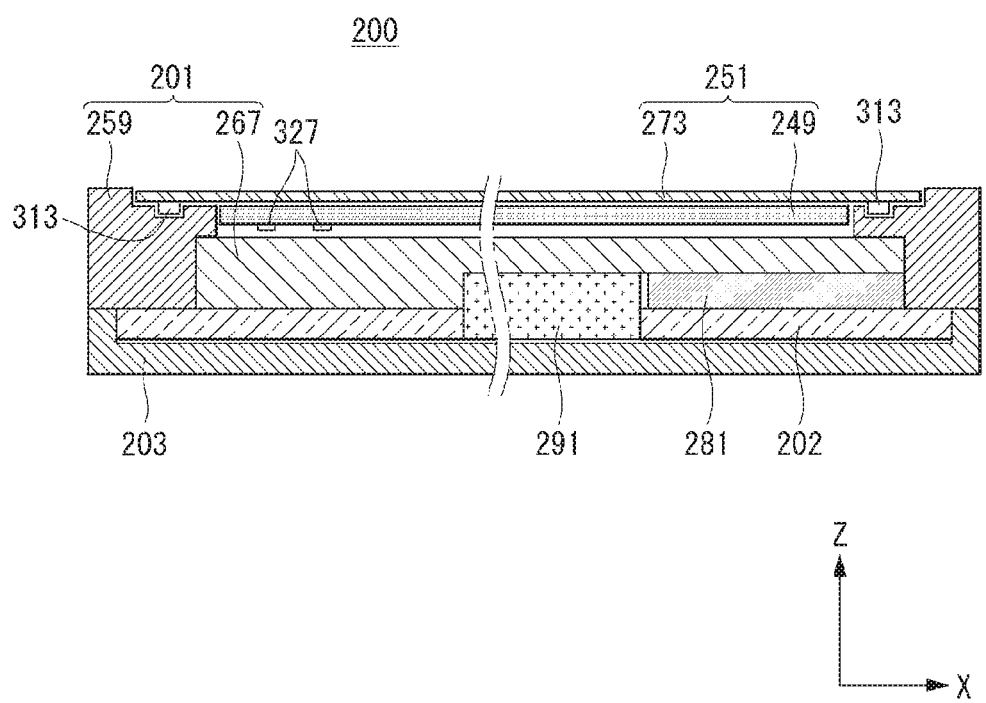

Next, FIG. 15 is a flow chart illustrating a method of installing an antenna of an electronic device according to another embodiment of the present disclosure, and FIGS. 16 and 17 are a disassembled plan view and a perspective view illustrating an electronic device according to another embodiment of the present disclosure.

Referring to FIGS. 15 and 16, in order to install an antenna in an electronic device, first, a window glass 273 and a display module 249 are prepared (S110). Next, a pattern of a first coil 313 is printed along an edge region of the window glass 273 (S120). The first coil 313 is printed in a loop shape having at least one turn on the window glass 273. A printing scheme of the first coil 313 may be similar to the aforementioned printing scheme.

Thereafter, a second coil 327 is printed in a loop shape having at least one turn on the display module 249 (S130). In more detail, the second coil 327 is printed on a lower end portion of a rear surface of the display module 249. A printing scheme of the second coil 327 may be similar to the aforementioned printing scheme.

Finally, the window glass 273 and the display module 249 are coupled to connect the first coil 313 and the second coil 327 (S140). For example, the first coil 313 and the second coil 327 can be connected by a conductive hole 284. The conductive hole 284 can be connected at least two portions of the first coil 313 and at least two portions of the second coil 327. Accordingly, the first coil 313 and the second coil 327 can be electrically connected to each other. At least two portions of the conductive hole 284 can be connected to an FPCB 277 (to be described hereinafter).

The first coil 313 and the second coil 327 can be connected to the FPCB 277. In this instance, the FPCB 277 can serve as a power feed supplying energy to the first coil 313 and the second coil 327. Referring to FIG. 17, the first coil 313 is positioned on a rear surface of the window glass 273, and the second coil 327 is positioned in a lower end portion of a rear surface of the display module 249. A region of the edge frame 259 facing the region in which the first coil 313 is positioned can be inwardly depressed to secure a space for the first coil 313.

In the electronic device 200 according to an embodiment of the present disclosure, the second coil 327 can be positioned on a rear surface of the display module 249. The second coil 327 can be positioned to be spaced apart from a speaker or a camera of the display module 249. That is, the second coil 327 may be less interfered with noise.

Figure 18:
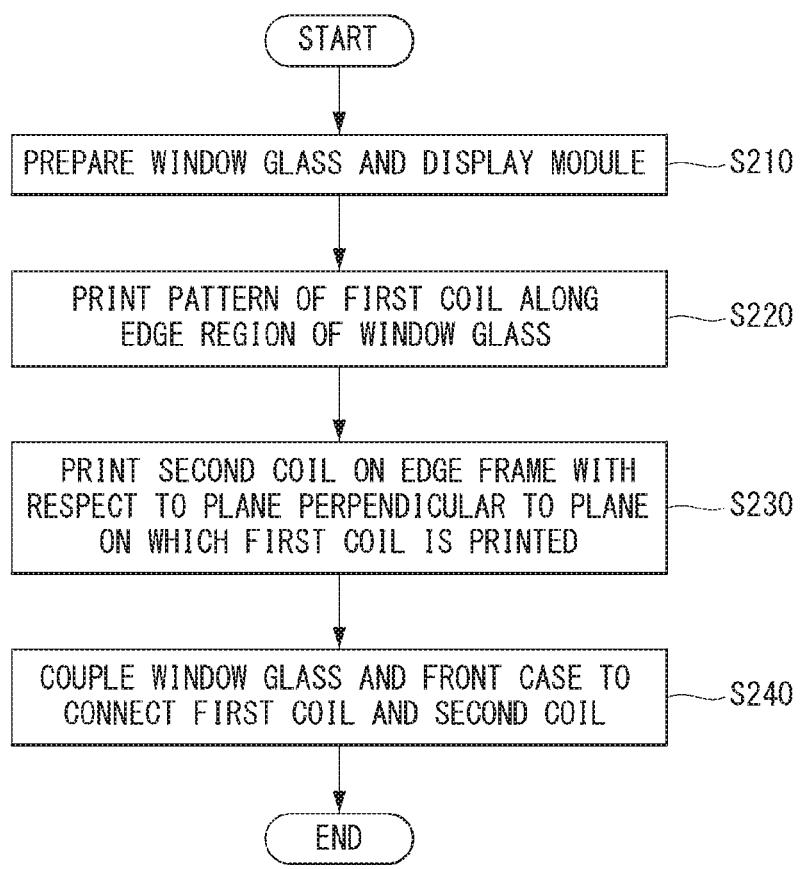
FIG. 18 is a flow chart illustrating a method of installing an antenna of an electronic device according to another embodiment of the present disclosure.

FIG. 18 is a flow chart illustrating a method of installing an antenna of an electronic device according to another embodiment of the present disclosure. In addition, FIG. 19 is a disassembled plan view of an electronic device according to an embodiment of the present disclosure, and FIG. 20 includes a cross-sectional view and a disassembled cross-sectional view of an electronic device according to an embodiment of the present disclosure.

Figure 19:
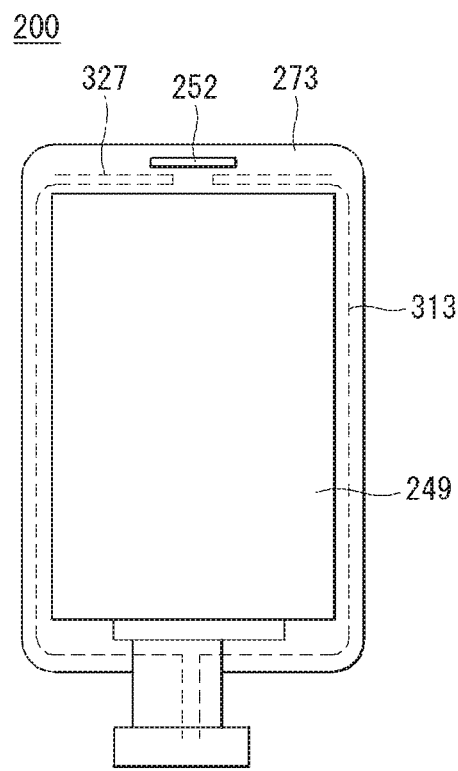
FIG. 19 is a disassembled plan view of an electronic device according to an embodiment of the present disclosure.
Figure 20:
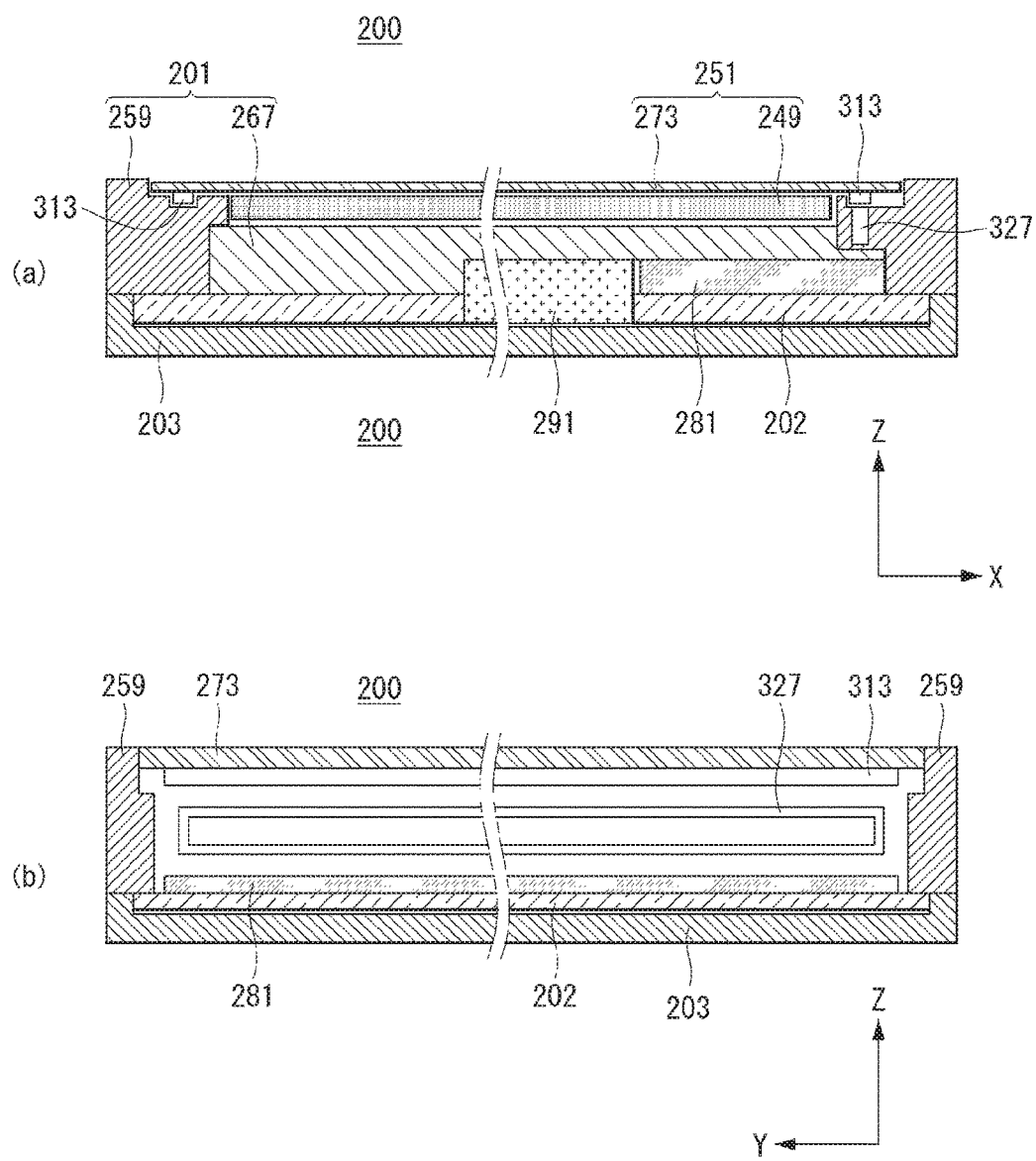
FIG. 20 includes cross-sectional view and a disassembled cross-sectional view of an electronic device according to an embodiment of the present disclosure.

Referring to FIGS. 18 through 20, in order to install an antenna in an electronic device, first, a window glass 273 and a front case 201 may be prepared (S210). Next, a pattern of a first coil 313 is printed along an edge region of the window glass 273 (S220). In more detail, a pattern of the first coil 313 is printed along an edge region of a lower surface of the window glass 273. The first coil 313 is printed in a loop shape having at least one turn on the window glass 273. A printing scheme of the first coil 313 may be similar to the aforementioned printing scheme.

Thereafter, a second coil 327 is printed on an edge frame 259 with respect to a plane perpendicular to the surface on which the first coil 313 is printed (S230). In other words, the loop shape of the second coil 327 and the loop shape of the first coil 313 may be perpendicular to each other.

A region of the edge frame 259 facing the region in which the first coil 313 is positioned may be inwardly depressed to secure a space for the first coil 313. As illustrated in (b) of FIG. 20, the second coil 327 may have a loop shape with respect to a plane of the electronic device 200 in a thickness direction.

Finally, the window glass 273 and the front case 201 are coupled to connect the first coil 313 and the second coil 327 (S240). For example, the first coil 313 and the second coil 327 can be connected by a conductive hole 284. The conductive hole 284 can be connected at least two portions of the first coil 313 and at least two portions of the second coil 327. Accordingly, the first coil 313 and the second coil 327 can be electrically connected to each other. At least two portions of the conductive hole 284 can be connected to a PCB 281.

In the electronic device 200 according to an embodiment of the present disclosure, the first coil 313 and the second coil 327 may be formed in a direction perpendicular to each other. Thus, the second coil 327 is reduced in space restrictions, and thus, a loop thereof may be formed to be greater. That is, the antenna of the electronic device 200 can radiate a greater amount of magnetic field.

Figure 21:
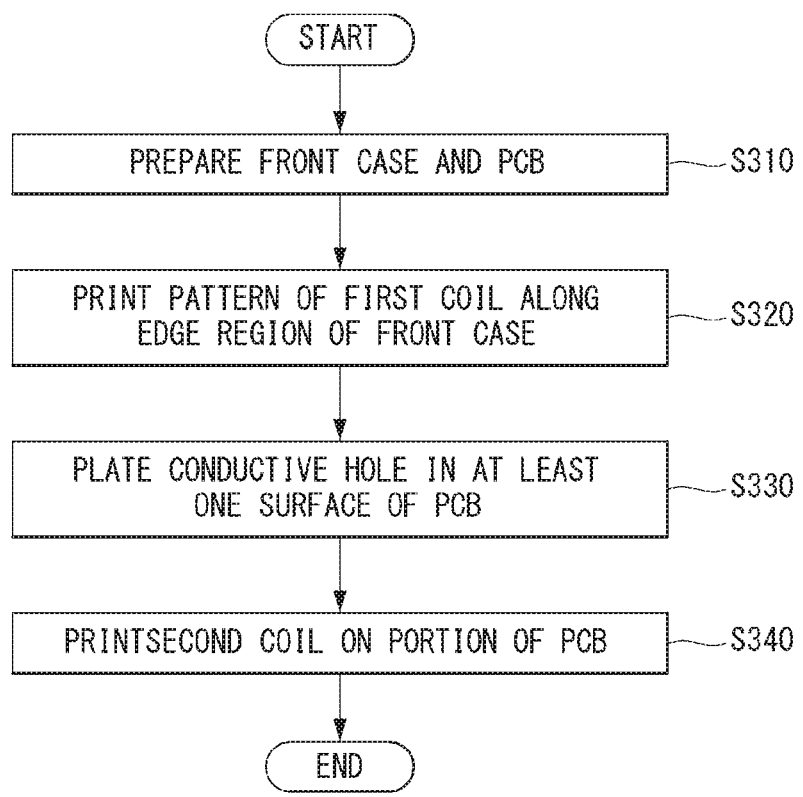
FIG. 21 is a flow chart illustrating a method of installing an antenna of an electronic device according to another embodiment of the present disclosure.
Figure 22:
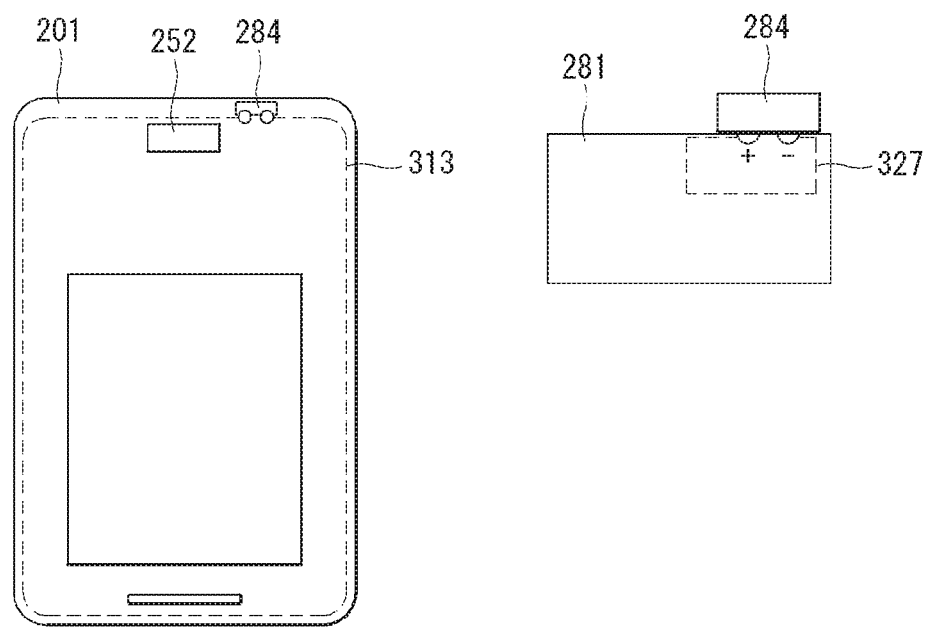
FIGS. 22 and 23 are a disassembled plan view and a cross-sectional view of an electronic device according to another embodiment of the present disclosure.
Figure 23:
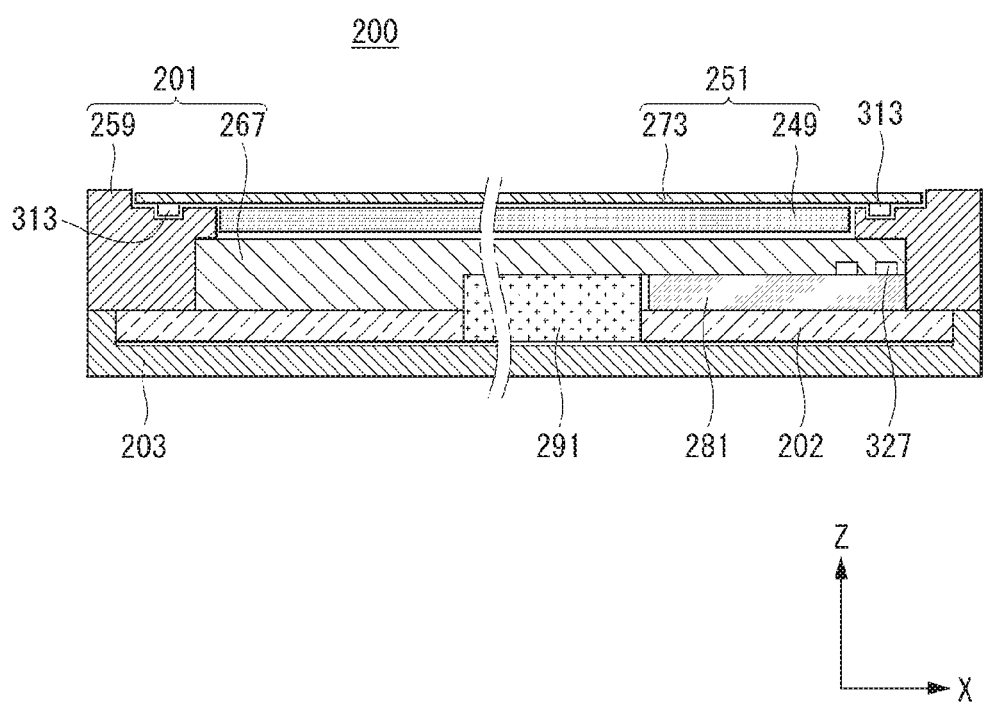

FIG. 21 is a flow chart illustrating a method of installing an antenna of an electronic device according to another embodiment of the present disclosure, and FIGS. 22 and 23 are a disassembled plan view and a cross-sectional view of an electronic device according to another embodiment of the present disclosure.

Referring to FIGS. 21 and 22, in order to install an antenna in an electronic device, first, a front case 201 and a PCB 281 may be prepared (S310). Next, a pattern of a first coil 313 is printed along an edge region of the front case 201 (S320). In more detail, a pattern of the first coil 313 is printed along an edge region of the front case 201 on an upper surface of an edge frame 259. For example, the first coil 313 is printed in a loop shape having at least one turn on the front case 201. A printing scheme of the first coil 313 may be similar to the aforementioned printing scheme. At least a portion of the first coil 313 may be coupled to a conductive hole 284 positioned in at least a portion of the front case 201.

Next, the conductive hole 284 may be placed on at least one surface of the PCB 281 (S330). In more detail, protrusions of at least two portions of the conductive hole 284 may be brought into contact with at least one surface of the PCB 281 and plated. The conductive hole 284 can serve to electrically connect the first coil 313 and the second coil 327 (to be described hereinafter).

Thereafter, the second coil 327 is printed in a region of the PCB 281 (S340). In more detail, the second coil 327 is printed by setting at least two portions where the PCB 281 and the conductive hole 284 are in contact, as both ends. Accordingly, the first coil 313 and the second coil 327 can be electrically connected.

Referring to FIG. 23, the first coil 313 can be positioned on an upper surface of the edge frame 259. In order to secure a space in which the first coil 313 is to be inserted between the edge frame 259 and the window glass 273, a region around the first coil 313 in the edge frame 259 can be depressed.

The second coil 327 can be positioned on at least one upper surface of the PCB 281. In order to secure a space for the second coil 327, a central frame 267 and the PCB 281 may be spaced apart from one another. In the electronic device 200 according to an embodiment of the present disclosure, since the second coil 327 is printed within the PCB 281, a waste of a space according to installation of the second coil 327 can be reduced.

Figure 24:
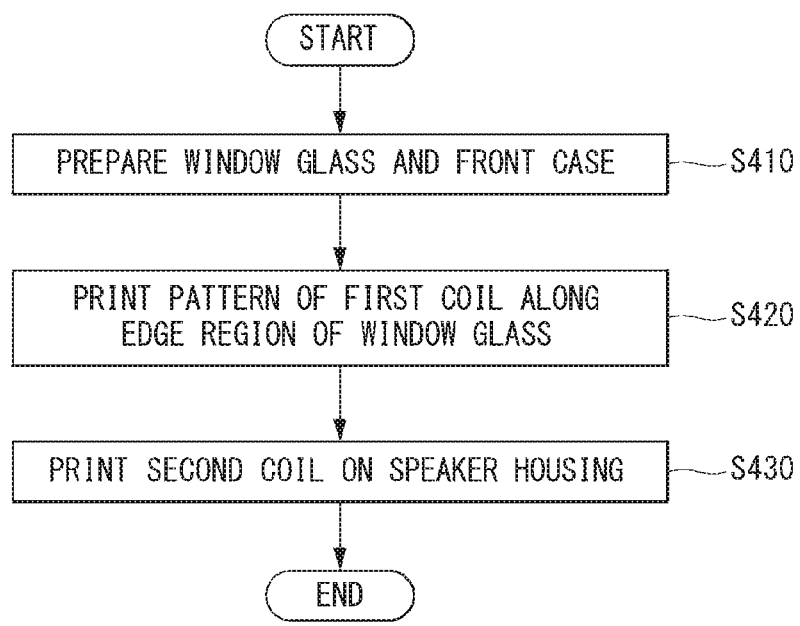
FIG. 24 is a flow chart illustrating a method of installing an antenna of an electronic device according to another embodiment of the present disclosure.
Figure 25:
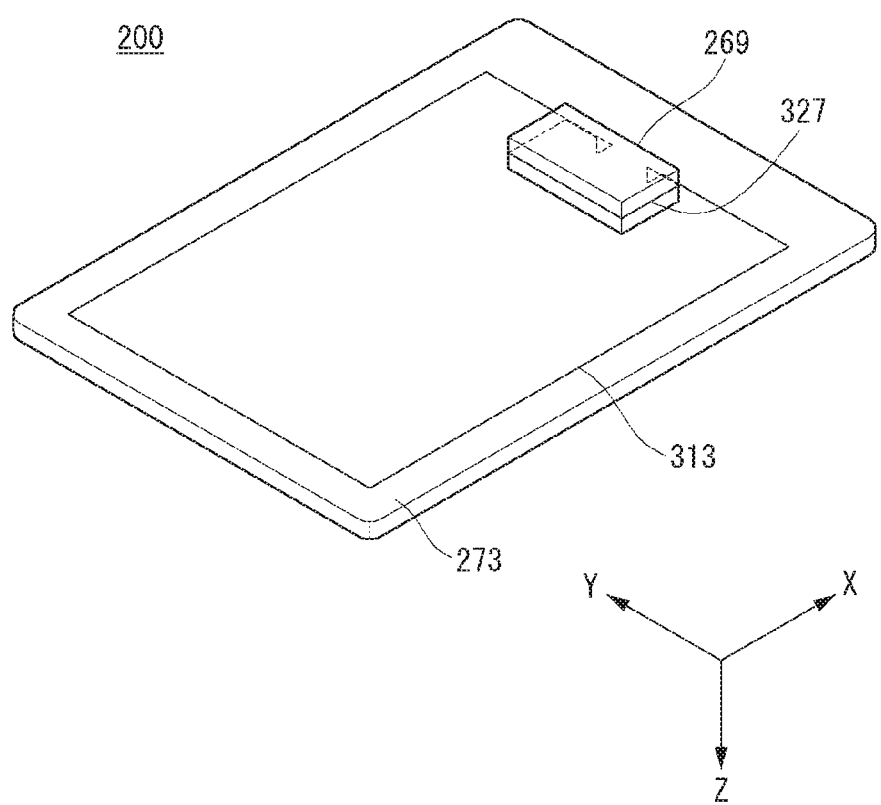
FIGS. 25 and 26 are disassembled perspective views of an electronic device according to an embodiment of the present disclosure.
Figure 26:
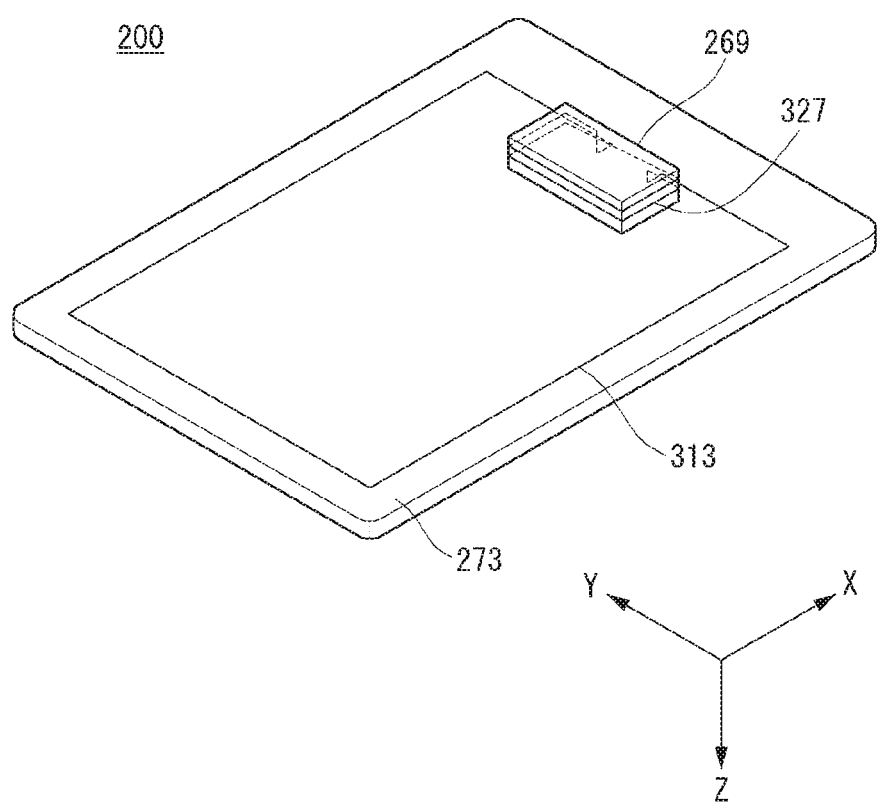

FIG. 24 is a flow chart illustrating a method of installing an antenna of an electronic device according to another embodiment of the present disclosure, and FIGS. 25 and 26 are disassembled perspective views of an electronic device according to an embodiment of the present disclosure.

Referring to FIGS. 24 and 25, in order to install an antenna in an electronic device, first, a window glass 273 and a front case 201 may be prepared (S410). Next, a pattern of a first coil 313 is printed along an edge region of the window glass 273 (S420). In more detail, a pattern of the first coil 313 is printed along an edge region of a lower surface of the window glass 273. The first coil 313 is printed in a loop shape having at least one turn on the window glass 273. A printing scheme of the first coil 313 may be similar to the aforementioned printing scheme.

Thereafter, a second coil pattern 327 is printed in a loop shape having at least one turn on a speaker housing 269 (S430). In more detail, the second coil 327 is printed to cover a side surface of the speaker housing 269 protecting a speaker of the front case. A printing scheme of the second coil 327 can be similar to the aforementioned printing scheme.

In this instance, the first coil 313 and the second coil 327 may be directly connected to each other. That is, the first coil 313 and the second coil 327 may be continuous. However, the present disclosure is not limited thereto and the first coil 313 and the second coil 327 can be connected by a conductive hole.

Referring to FIG. 26, the second coil 327 can be formed to have at least two or more turns. When the second coil 327 is formed to have at least two or more turns, the second coil 327 can radiate a stronger magnetic field. According to the present embodiment, since the second coil 327 is positioned at the speaker housing 269, there is no problem in securing a space even though the second coil 327 is formed to have a plurality of turns.

In the electronic device 200 according to an embodiment of the present disclosure, the second coil 327 can be positioned on a side surface of the speaker housing 269. Thus, a space in which the second coil 327 is to be installed may be increased.

Figure 27:
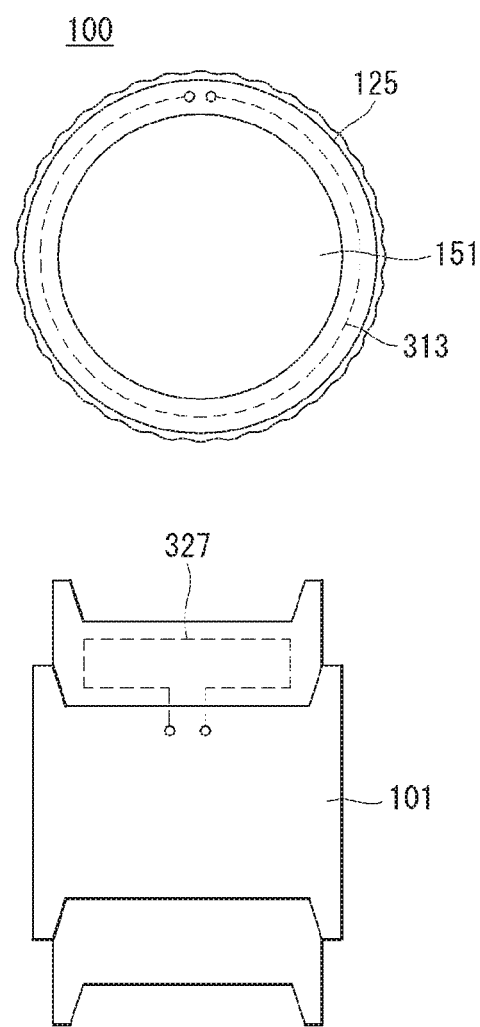

FIGS. 27 through 29 are disassembled plan views of an electronic device according to an embodiment of the present disclosure. Referring to FIGS. 27 and 28, a pattern of a first coil 313 is printed along an edge region of a window glass 125. The first coil 313 is printed in a loop shape having at least one turn on the window glass 273. A printing scheme of the first coil 313 can be similar to the aforementioned printing scheme.

A second coil 327 is printed on an upper or lower connection region of the main body part 101 connected to the band part 130 (of FIG. 6). In more detail, both ends of the second coil 327 can be positioned in a central region of the main body part 101, and the loop shape can be positioned in the upper or lower connection region of the main body part 101. A printing scheme of the second coil 327 can be similar to the aforementioned printing scheme.

The first coil 313 and the second coil 327 may couple the window glass 125 and the main body part 101 by a conductive hole 284 to electrically connect them. The conductive hole 284 can be connected at least two portions of the first coil 313 and at least two portions of the second coil 327. Accordingly, the first coil 313 and the second coil 327 can be electrically connected to each other. The conductive hole 284 may also be connected to the circuit unit 184 (of FIG. 6) in at least two portions thereof.

Referring to FIG. 29, a pattern of a first coil 313 is printed along an edge region of a window glass 125. A printing scheme of the first coil 313 can be similar to the aforementioned printing scheme.

The second coil 327 can be positioned in a central region of the main body part 101. In more detail, the second coil 327 can be positioned to surround a central region of the main body part 101. A printing scheme of the second coil 327 can be similar to the aforementioned printing scheme.

In the electronic device 100 according to an embodiment of the present disclosure, the first coil 313 and the second coil 327 can be formed to have different heights in a thickness direction of the electronic device 200. Thus, the first coil 313 and the second coil 327 can radiate a stronger magnetic field though ground coupling.

Figure 30:
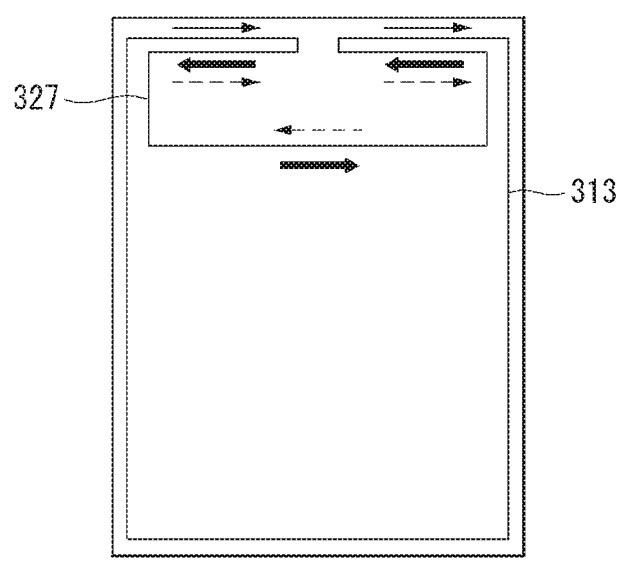
FIG. 30 is a view illustrating an effect of a second coil of an electronic device according to an embodiment of the present disclosure.

FIG. 30 is a view illustrating an effect of a second coil of an electronic device according to an embodiment of the present disclosure. Referring to FIG. 30, in a region in which a first coil 313 and a second coil 327 face each other, currents can flow in the mutually opposite directions. For example, current can flow in a first direction, a clockwise direction, in the first coil 313, and current can flow in a second direction, counterclockwise direction, in the second coil 327.

In an existing electronic device, when current flows in the first coil 313, an eddy current may be generated in an opposite direction according to an images theory. The eddy current may be a ground current. Further, the eddy current may flow in a direction opposite to that of the current of the first coil 313. Accordingly, the eddy current can generate a magnetic field in a direction opposite to a direction of the magnetic field generated by the first coil 313. The magnetic field generated by the eddy current may reduce an amount of the overall radiated magnetic field, compared with an amount of the magnetic field generated by the first coil 313.

In contrast, in the electronic device according to an embodiment of the present disclosure, since the second coil 327 in which current flows in a direction opposite to the direction of the current of the first coil 313 is provided, an eddy current can flow in the same direction as that of the first coil 313. Thus, an amount of the magnetic field radiated by the first coil 313 and the second coil 327 may be greater.

As illustrated in FIG. 30, it can be seen that a current direction of the first coil indicated by the thin solid lines and a direction of a ground current indicated by the dotted lines are the same and opposite to the current direction of the second coil 327 indicated by the thick solid lines.

Figure 31:
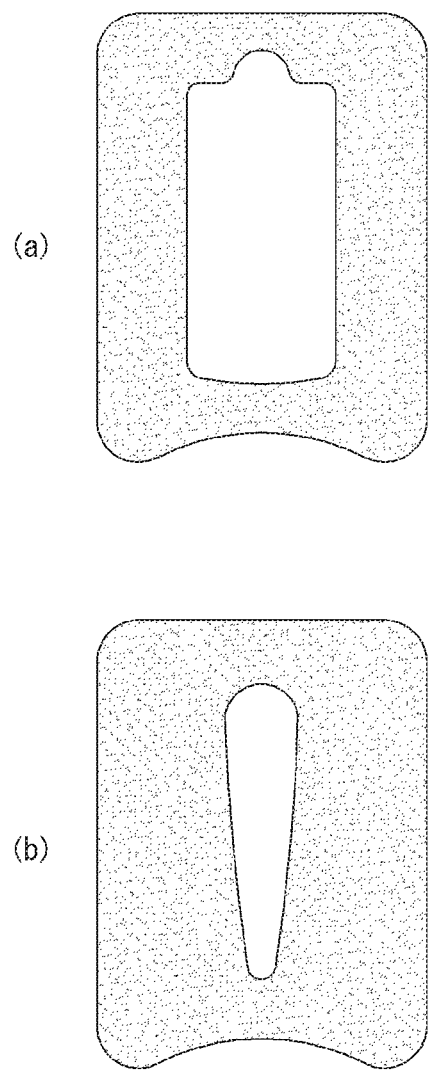
FIG. 31 includes views illustrating magnetic fields radiated in electronic devices according to an embodiment of the present disclosure.

FIG. 31 includes views illustrating magnetic fields radiated in electronic devices according to an embodiment of the present disclosure. Referring to FIG. 31, as illustrated in (a) of FIG. 31, in an existing electronic device without a second coil, a wide null point may be formed in a central portion of a radiated magnetic field. In the null point, there is no amount of a radiated magnetic field or a very little amount of magnetic field may be irradiated.

In contrast, as illustrated in (b) of FIG. 31, in the electronic device with a second coil according to an embodiment of the present disclosure, it can be seen that a considerable amount of null point is reduced. This may be because a large amount of magnetic field is radiated from the electronic device since a direction of a ground coupling current and a direction of the current flowing in the first coil are the same.

Figure 32:
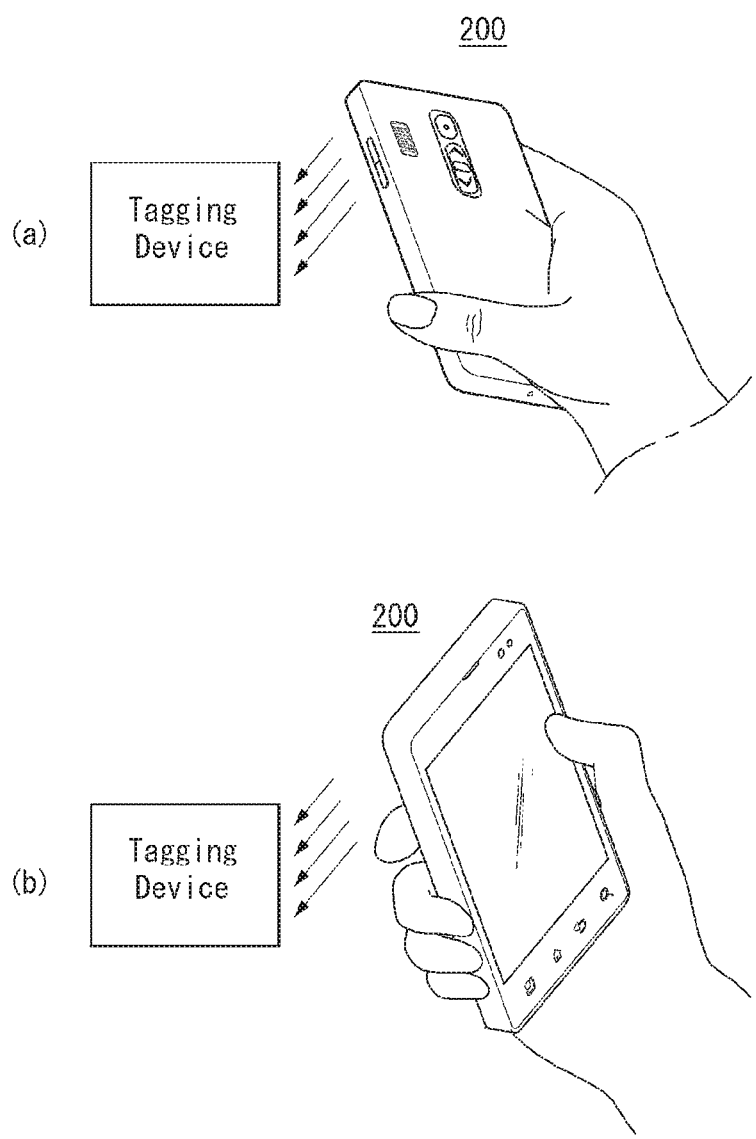
FIG. 32 is a view illustrating an effect of an electronic device according to an embodiment of the present disclosure.

FIG. 32 includes views illustrating an effect of an electronic device according to an embodiment of the present disclosure. Referring to (a) of FIG. 32, the electronic device 200 according to the present disclosure may have an antenna installed on a front surface thereof. Thus, users may conveniently tag the electronic device 200 to a card reader, while in the course of using the electronic device 200.

In contrast, referring to (b) of FIG. 32, the electronic device according to the related art may have an antenna installed on a rear surface thereof. Thus, in order to tag the electronic device 200 to a card reader, a wrist of the users, while using the electronic device 200, should face a card reader, causing inconvenience.

Figure 33:
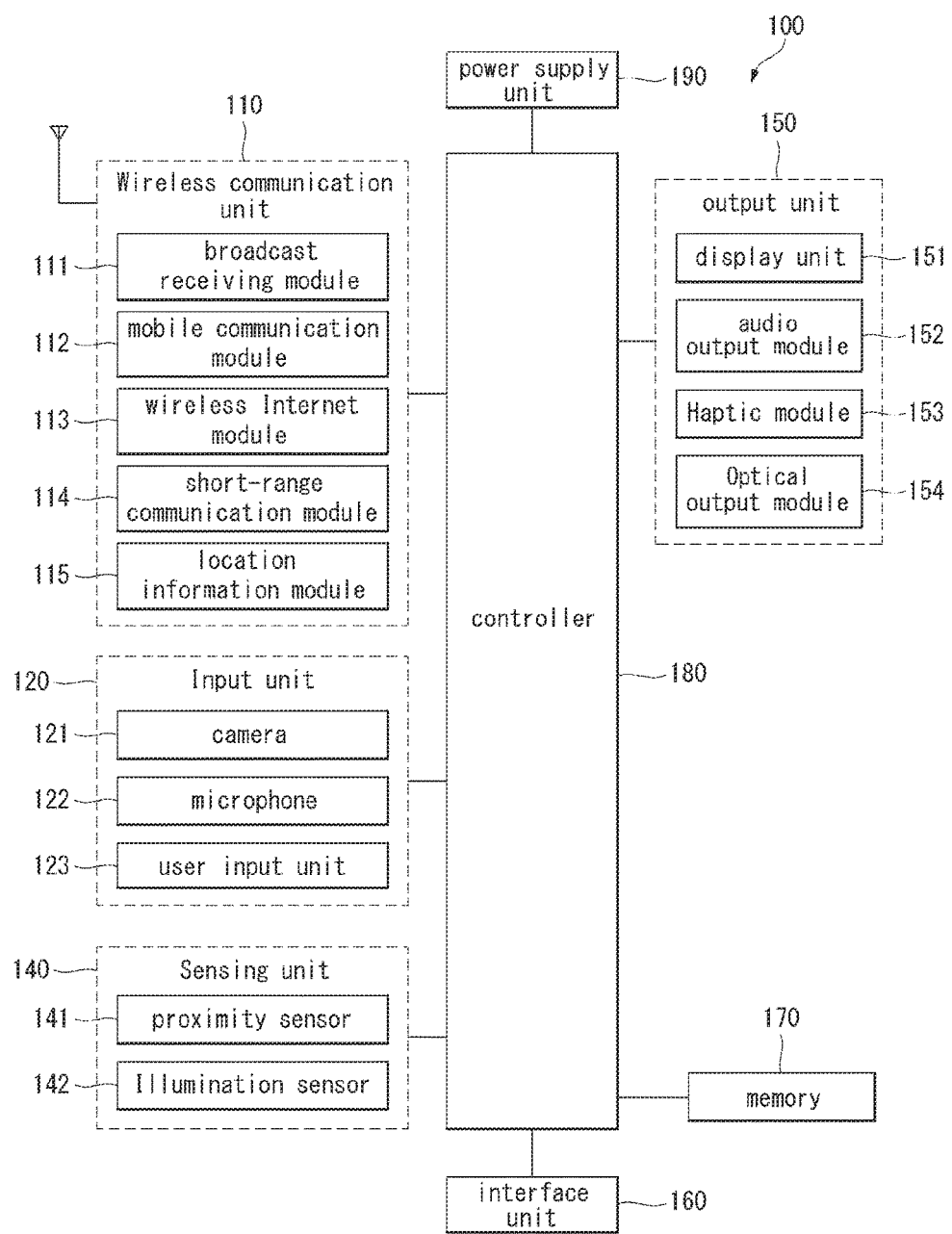
FIG. 33 is a block diagram of an electronic device in accordance with the present disclosure.

FIG. 33 is a block diagram of an electronic device in accordance with the present disclosure. Referring to FIG. 33, the mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 33, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 33, or activating application programs stored in the memory 170. As one example, the controller 180 controls some or all of the components illustrated in FIG. 33 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a window glass;
   a display module positioned behind the window glass;
   a case positioned behind the display module;
   a first electrode connected to a rear surface of the window glass and connected to a front surface of the case;
   a second electrode connected to the rear surface of the window glass, connected to the front surface of the case, and adjacent to the first electrode;
   a first coil formed on the rear surface of the window glass and electrically connecting the first electrode and the second electrode; and
   a second coil formed on the front surface of the case and electrically connecting the first electrode and the second electrode.

2. The mobile terminal of claim 1, wherein the first coil is positioned in an outer region of the display module.

3. The mobile terminal of claim 1, wherein the first coil and the second coil have a loop shape, and form at least one turn.

4. The mobile terminal of claim 1, wherein the first coil surrounds the display module.

5. The mobile terminal of claim 4, further comprising:
   a printed circuit board (PCB) electrically connected to the first coil or the second coil and configured to transmit and receive an electrical signal to and from the first coil and the second coil.

6. The mobile terminal of claim 1, further comprising:
   a flexible printed circuit board (FPCB) configured to connect a lower portion of the display module,
   wherein the first coil is electrically connected to the FPCB in at least one portion thereof.

7. The mobile terminal of claim 1, further comprising:
   a speaker positioned in at least a portion of the case.

8. The mobile terminal of claim 7, wherein the second coil is positioned in an outer region of the speaker.

9. The mobile terminal of claim 7, wherein the second coil is positioned on a plane perpendicular to a plane on which the first coil is positioned.

10. The mobile terminal of claim 7, wherein the case further includes a speaker housing configured to protect the speaker, and
    wherein the second coil enfolds a side surface of the speaker housing.

11. The mobile terminal of claim 1, wherein the second coil is positioned in a lower end portion of a rear surface of the display module.

12. The mobile terminal of claim 1, further comprising:
    a printed circuit board (PCB) configured to transmit and receive an electrical signal to and from the first and second coils,
    wherein the second coil is positioned on the PCB.

13. The mobile terminal of claim 1, wherein the case includes an edge frame and center frame,
    wherein the center frame supports the display module, and
    wherein the second coil is formed on an upper surface of the edge frame.

14. The mobile terminal of claim 1, further comprising:
    a battery configured to supply power to the mobile terminal; and
    a battery cover positioned on a back side of the display module and including a metal.

15. The mobile terminal of claim 1, wherein a first area surrounded by the first coil is larger than a second area surrounded by the second coil.

16. The mobile terminal of claim 15, wherein the first area and the second area face each other.

* * * * *